(12) United States Patent
Amir et al.

(10) Patent No.: US 12,073,704 B2
(45) Date of Patent: Aug. 27, 2024

(54) METHOD AND SYSTEM FOR MANAGING SAFETY DEVICES IN A BUILDING DURING THE DETECTION OF A THREAT EVENT

(71) Applicant: Survia Ltd., Tel Aviv (IL)

(72) Inventors: Roy Amir, Tel Aviv (IL); Eyal Artsiely, Tel Aviv (IL); Shlomi Sharabani, Tel Aviv (IL); Avi Ringel, Tel Aviv (IL); Gideon Fisher, Tel Aviv (IL)

(73) Assignee: Survia Ltd., Tel Aviv (IL)

( * ) Notice: Subject to any disclaimer, the term of this patent is extended or adjusted under 35 U.S.C. 154(b) by 80 days.

(21) Appl. No.: 17/795,381

(22) PCT Filed: Jan. 28, 2021

(86) PCT No.: PCT/IB2021/000037
§ 371 (c)(1),
(2) Date: Jul. 26, 2022

(87) PCT Pub. No.: WO2021/152392
PCT Pub. Date: Aug. 5, 2021

(65) Prior Publication Data
US 2023/0055822 A1    Feb. 23, 2023

Related U.S. Application Data

(60) Provisional application No. 62/967,308, filed on Jan. 29, 2020.

(51) Int. Cl.
| | | |
|---|---|---|
| *G08B 21/10* | (2006.01) | |
| *G16Y 20/10* | (2020.01) | |

(Continued)

(52) U.S. Cl.
CPC .............. *G08B 21/10* (2013.01); *G16Y 20/10* (2020.01); *G16Y 40/10* (2020.01); *H04L 67/12* (2013.01)

(58) Field of Classification Search
CPC ........ G08B 21/10; G16Y 20/10; G16Y 40/10; H04L 67/12

(Continued)

(56) References Cited

U.S. PATENT DOCUMENTS

| | | | | |
|---|---|---|---|---|
| 2012/0163380 A1* | 6/2012 | Kolbe | ..................... | H04M 3/42 370/390 |
| 2018/0275295 A1* | 9/2018 | Bleier | ..................... | G01V 3/08 |

(Continued)

FOREIGN PATENT DOCUMENTS

| | | | | |
|---|---|---|---|---|
| CN | 107654157 A | * | 2/2018 | .............. E05F 15/72 |
| CN | 107654157 A | | 2/2018 | |

(Continued)

OTHER PUBLICATIONS

International Search Report and Written Opinion from International Application No. PCT/IB2021/000037 dated Jul. 22, 2021.

*Primary Examiner* — Kerri L McNally
(74) *Attorney, Agent, or Firm* — GREENBERG TRAURIG, LLP

(57) ABSTRACT

A system includes a processor, safety devices including a door-related safety device, and environmental condition detection sensors. The processor is configured to receive environmental condition sensor data from the at least one environmental condition detection sensor. An imminent occurrence of a threat event tis detected that would cause the damage a building. A risk analysis model analyzes threat event related environmental condition sensor data to predict a risk value that the at least one threat event would cause the damage to the at least one building and to generate risk mitigation actions that at least reduces the damage during the actual occurrence of the threat event. Prior to the actual occurrence of the threat event, respective risk mitigation instructions are transmitted to actuators that cause an opera- (Continued)

tional state change of safety devices so as to at least reduce the damage to the building from the threat event.

21 Claims, 22 Drawing Sheets

(51) Int. Cl.
  *G16Y 40/10* (2020.01)
  *H04L 67/12* (2022.01)
(58) Field of Classification Search
  USPC .......................................................... 340/690
  See application file for complete search history.

(56) References Cited

U.S. PATENT DOCUMENTS

2018/0364375 A1* 12/2018 Naughton .............. G08B 21/18
2019/0340912 A1* 11/2019 Sellathamby ........ G08B 29/188
2020/0150508 A1* 5/2020 Patterson ................ B32B 27/36

FOREIGN PATENT DOCUMENTS

WO      2016/092536 A1    6/2016
WO      2017/183050 A1   10/2017

* cited by examiner

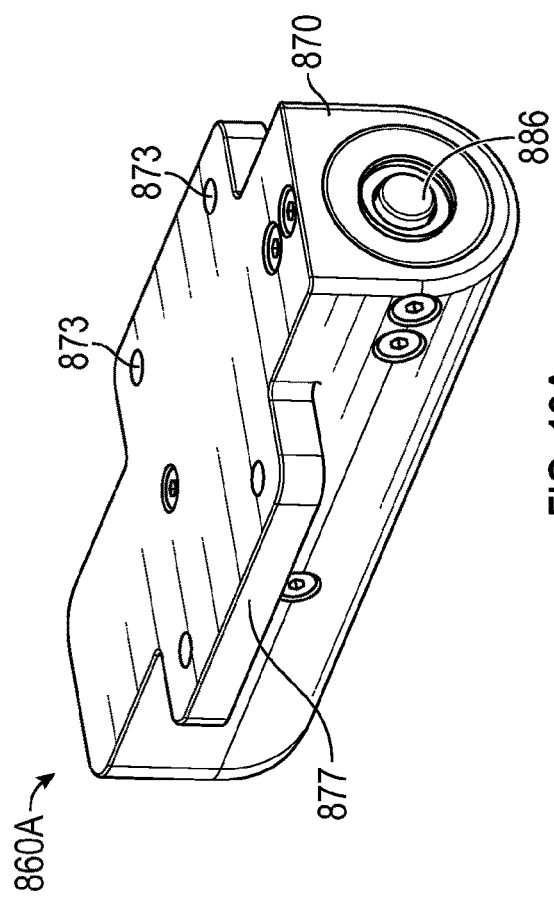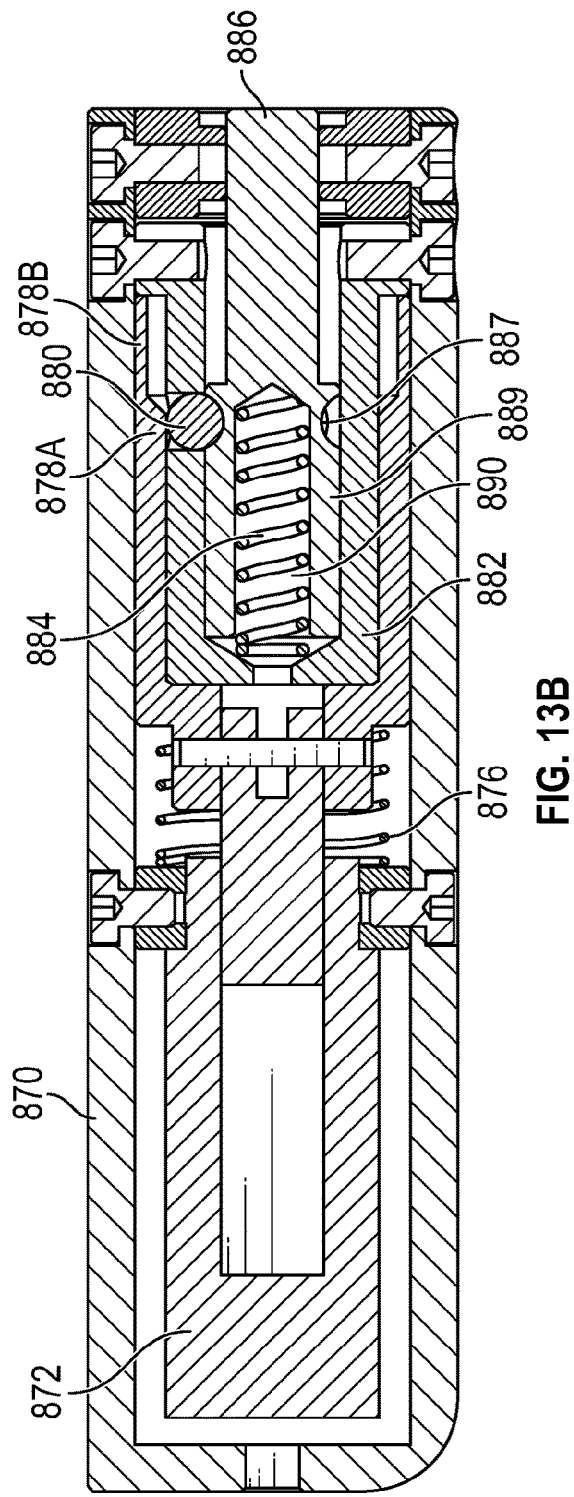

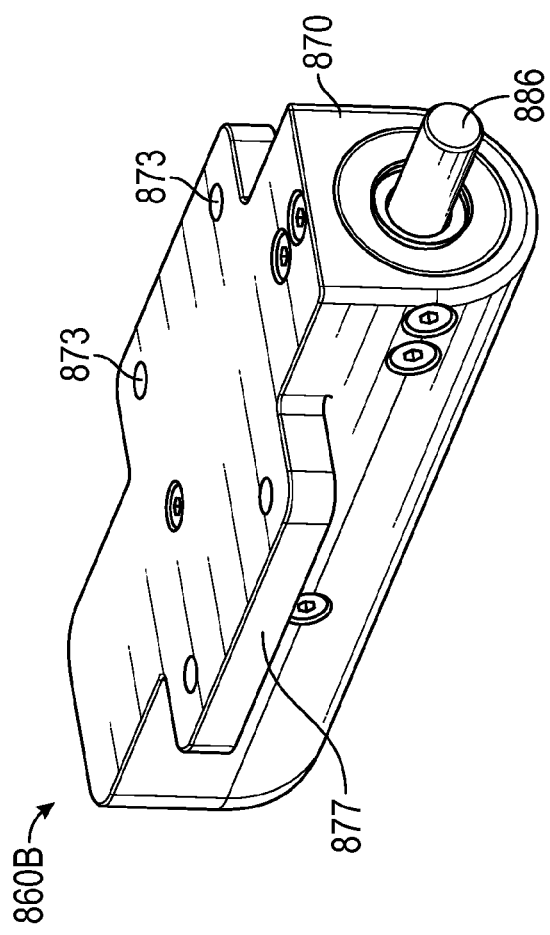
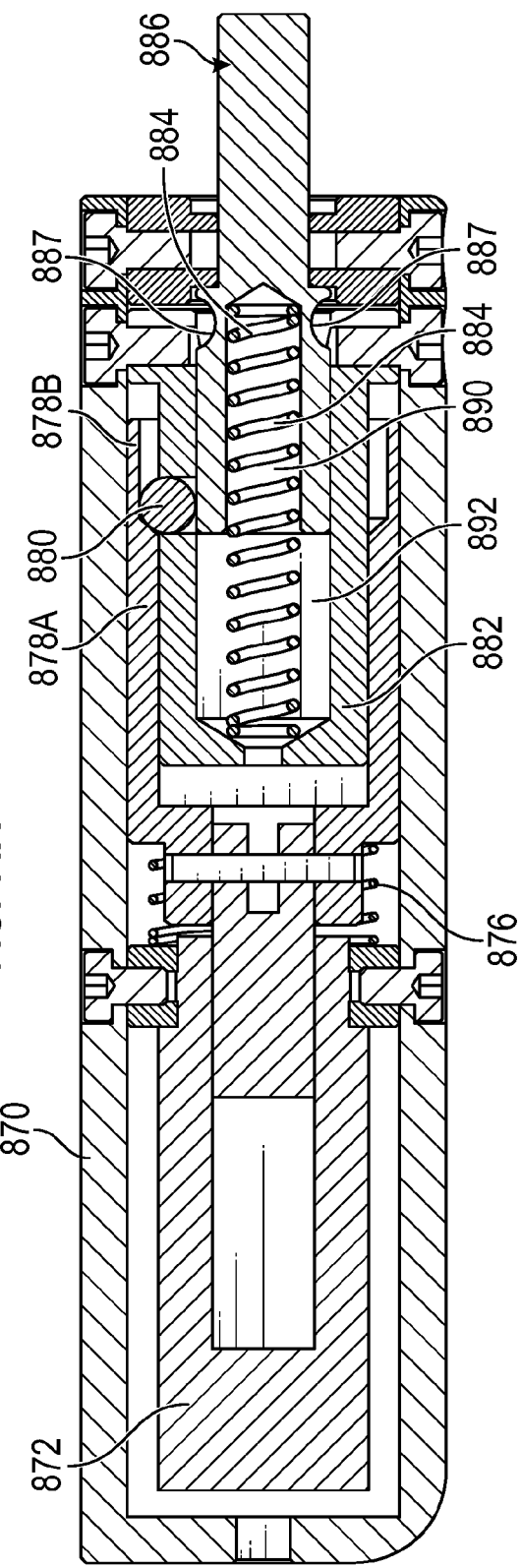
FIG. 14A
FIG. 14B

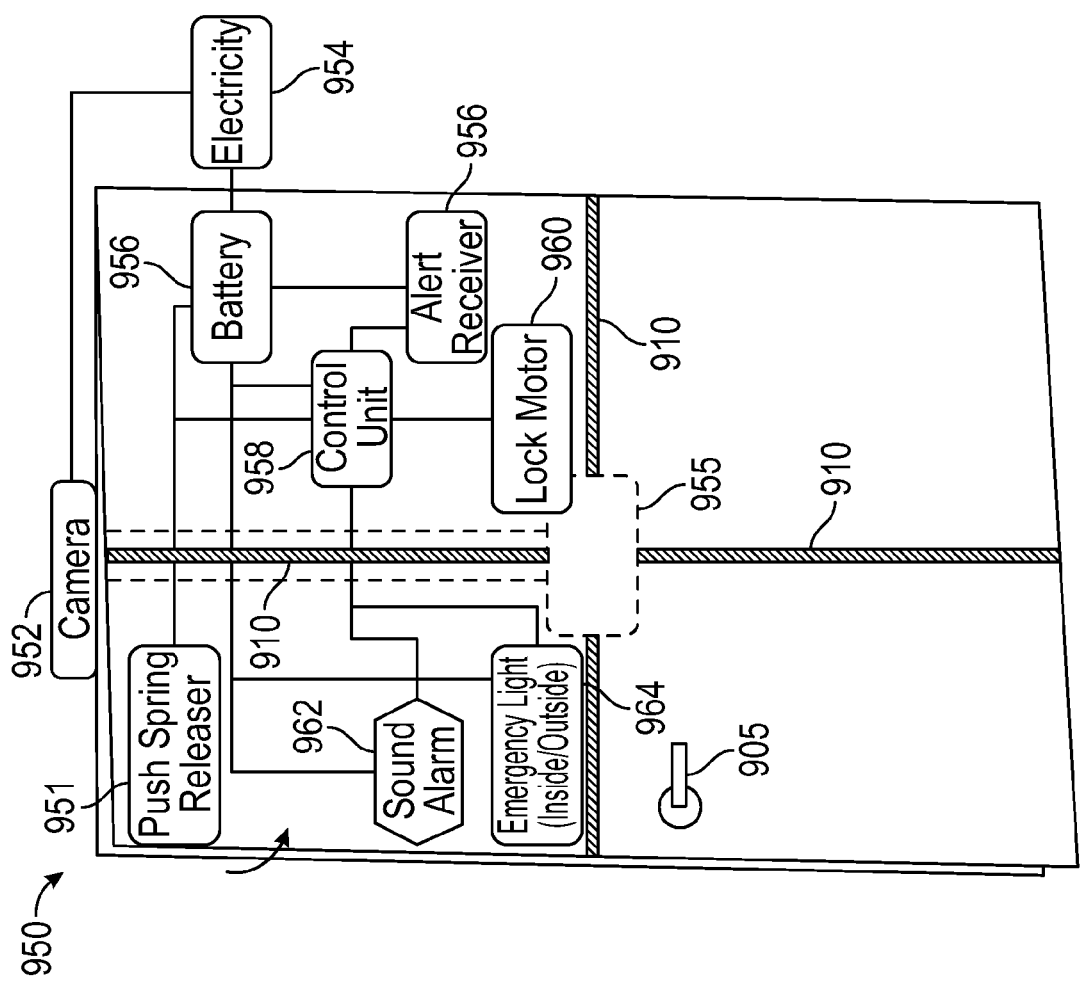
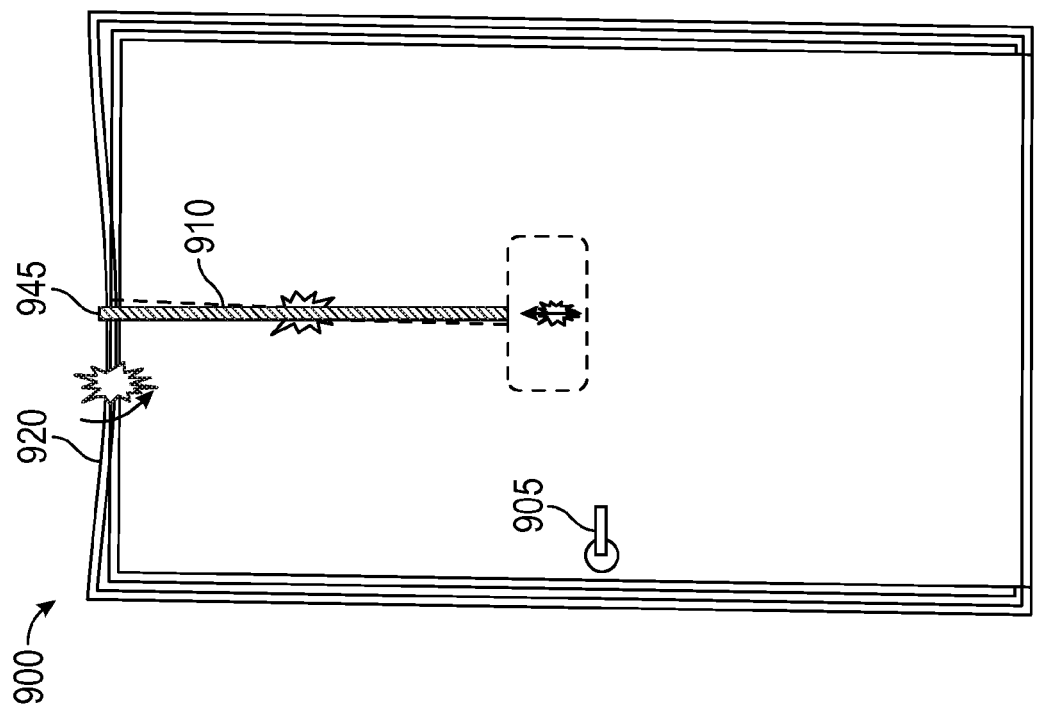
FIG. 15B
FIG. 15A

TABLE 1

| State | Vibration Intensity | Activating a Door Pusher | Pulling a Door Tab | Opening a Door Latch | Disconnecting Water Tap | Disconnecting Water Tap | Turn on Emergency Lighting | Disconnect Electrical Panel | Activate a Flashing Horn |
|---|---|---|---|---|---|---|---|---|---|
| N | Normal | X | X | X | X | X | X | X | X |
| A | Low Power | X | X | X | X | X | X | X | ✓ |
| B | Medium Power | X | X | ✓ | ✓ | ✓ | ✓ | ✓ | ✓ |
| C | Destructive Power | ✓ | ✓ | ✓ | ✓ | ✓ | ✓ | ✓ | ✓ |

FIG. 19

TABLE 2

| Risk Level | Damage Potential | Realization Probability | Affected Systems | Threat Description | |
|---|---|---|---|---|---|
| M | L | L | PLC | Cyber Attack and the Ability to Disable Earthquake Alert Systems | 1 |
| M | M | M | PLC | Change and Manipulation of Parameters in Controllers | 2 |
| L | L | L | PLC-Sensors | Failure to Transmit Alerts from the Sensors Towards the Decision-making System/ Presenting False Representations to the Controller and Management Systems | 3 |
| H | H | L | Electric Door Mechanism | Disruption of Door Opening Mechanism | 4 |
| H | H | H | System Management Computer | Utilization of the Management System by Means from the Main Control Room and the Secondary Room | 5 |
| H | M | H | System Management Computer | Connecting Peripheral Device to a Controller such as A DOK that Contains a Virus | 6 |
| L | L | L | System Components | Unauthorized Physical Access that Causes Damage to Controller<br><br>Exploitation of Weaknesses in Physical Control Mechanisms and Access to System Interfaces | 7 |
| M | M | L | PLC Controller and Management Interfaces | Lack of Segmentation and Causing Virus to Spread to all Connected Systems | 8 |
| L | L | L | All Systems | Exploiting Weaknesses in Network Protocols While Changing Parameters in End Unit (PLC) | 9 |
| L | L | L | PLC Controller | Lack of Identification Mechanism for the Systems Controllers-Connection to the Controller in the Field | 10 |
| L | L | L | All Systems | Lack of Registration and Follow-up-Identification Events(success and Failure Events) | 11 |

FIG. 20

METHOD AND SYSTEM FOR MANAGING SAFETY DEVICES IN A BUILDING DURING THE DETECTION OF A THREAT EVENT

FIELD

The present disclosure relates to safety devices in a building, and more particularly method and system for managing safety devices in a building during the detection of a threat event.

BACKGROUND

A multi-casualty disaster such as an earthquake, fire, flood, and/or missile attack, for example, may occur without warning, which may result in deaths, injuries, and damage to buildings, property and infrastructure. During such disasters, aside from building collapse and falling debris, damage to a building and other structures may result in persons and/or animals being trapped in those structures due to door frame deformation and blocked exit paths in the structure that may further result in death and/or injuries due to fire, gas leak explosions and torn power cables, for example. Thus, there is a need for systems and methods to detect an impending disaster, to alert people in the building of the impending disaster, and to reduce damage in the building as a result of the disaster.

SUMMARY

In some embodiments, the present disclosure provides an exemplary technically improved computer-based system that includes at least the following components of at least one processor, at least one memory, at least one environmental condition detection sensor, and a plurality of actuators to control a plurality of safety devices deployed in at least one building. The plurality of safety devices may include at least one door-related safety device. The at least one environmental condition detection sensor may be configured to at least measure environmental data related to at least one environmental condition that may cause a damage to the at least one building and generate environmental condition sensor data based on the environmental data. The at least one processor may be configured to execute computer code stored in the at least one memory that causes the at least one processor to receive, in real time, the environmental condition sensor data from the at least one environmental condition detection sensor, to detect, from the environmental condition sensor data, in real time, an imminent occurrence of at least one threat event that would cause the damage to the at least one building, where a detection of the imminent occurrence of the at least one threat event is prior to an actual occurrence of the at least one threat event, to utilize, upon the detection of the imminent occurrence of the at least one threat event, a risk analysis model to analyze threat event related environmental condition sensor data to predict a risk value that the at least one threat event would cause the damage to the at least one building, and generate at least one risk mitigation action that at least reduces the damage to the at least one building during the actual occurrence of the at least one threat event, and to cause to transmit, prior to the actual occurrence of the at least one threat event, based on the at least one risk mitigation action, each respective risk mitigation instruction to each respective actuator of the plurality of actuators so as to cause at least one operational state change of each respective safety device of the plurality of safety devices so as to at least reduce the damage to the at least one building from the at least one threat event.

In some embodiments, the present disclosure provides an exemplary technically improved computer-based method that includes at least the following steps of receiving, by at least one processor, in real time, environmental condition sensor data from at least one environmental condition detection sensor for measuring environmental data related to at least one environmental condition that may cause a damage to at least one building, and generating the environmental condition sensor data based on the environmental data. An imminent occurrence of at least one threat event that would cause the damage to the at least one building may be detected, by the at least one processor, from the environmental condition sensor data, in real time. A detection of the imminent occurrence of the at least one threat event is prior to an actual occurrence of the at least one threat event. A risk analysis model may be utilized, by the at least one processor, upon the detection of the imminent occurrence of the at least one threat event for analyzing threat event related environmental condition sensor data to predict a risk value that the at least one threat event would cause the damage to the at least one building, and generating at least one risk mitigation action that at least reduces the damage to the at least one building during the actual occurrence of the at least one threat event. The plurality of safety devices may include at least one door-related safety device. Each respective risk mitigation instruction may be transmitted, by the at least one processor, prior to the actual occurrence of the at least one threat event, based on the at least one risk mitigation action so as to cause at least one operational state change of each respective safety device of the plurality of safety devices so as to at least reduce the damage to the at least one building from the at least one threat event.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

FIGS. 13A and 13B are an isotropic and a cross-sectional view of an electric door opener device with a push rod in a standby mode in accordance with one or more embodiments of the present disclosure;

FIGS. 14A and 14B are an isotropic and a cross-sectional view of an electric door opener device with a push rod in a push mode in accordance with one or more embodiments of the present disclosure;

FIG. 15A is a view of a door stuck in a deformed door frame in accordance with one or more embodiments of the present disclosure;

FIG. 15B is a door with a door opening safety system for opening a door in door frame upon detection of a threat event in accordance with one or more embodiments of the present disclosure;

FIG. 19 is a table showing risk mitigation actions for a seismic event in accordance with one or more embodiments of the present disclosure; and FIG. 20 is a table showing a listing of different cyber and intruder system threats in accordance with one or more embodiments of the present disclosure.

DETAILED DESCRIPTION

Figure 1:
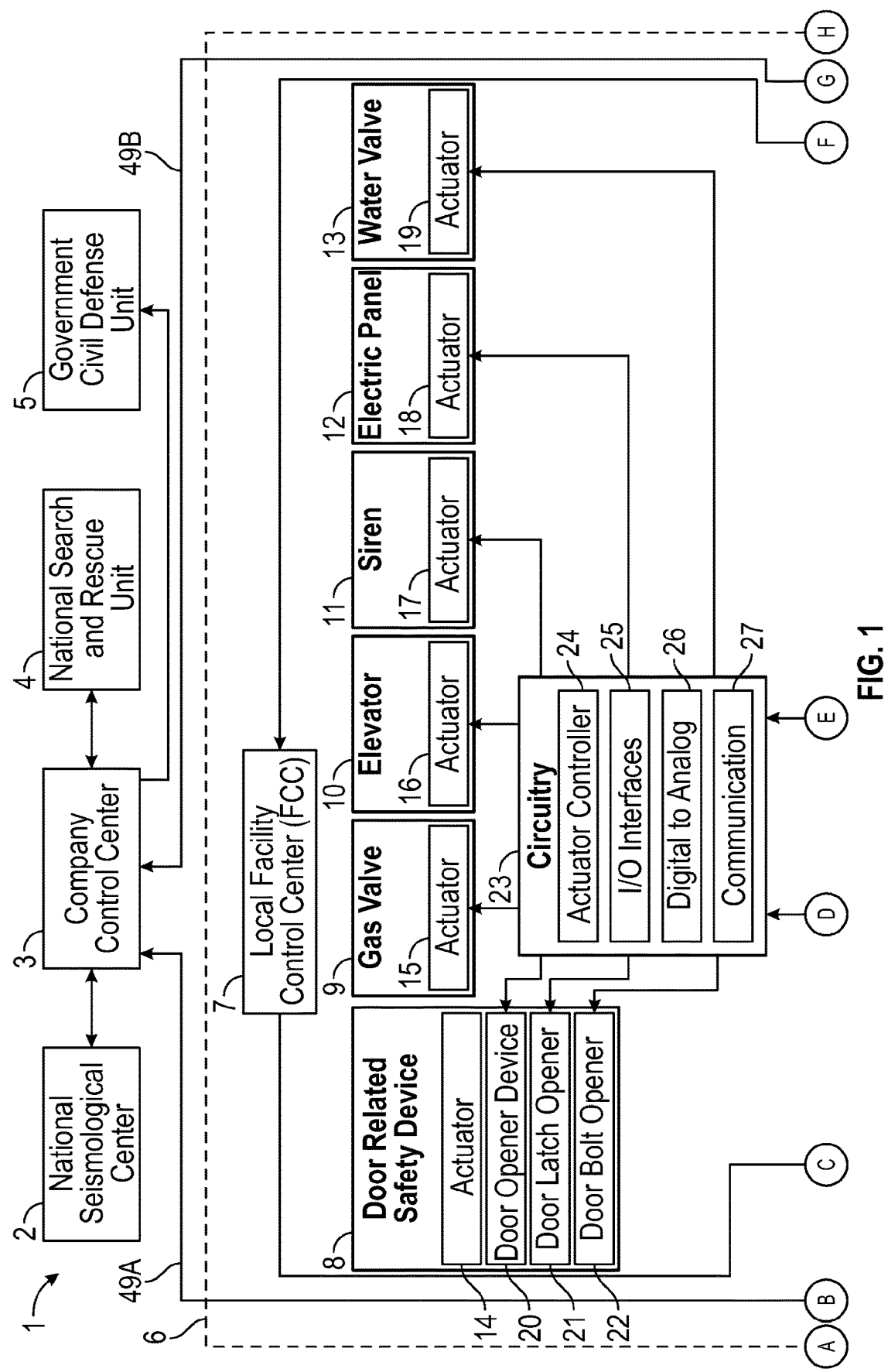
FIG. 1 is a system block diagram of a system for managing safety devices in a building during the detection of a threat event in accordance with one or more embodiments of the present disclosure.
Figure 1:
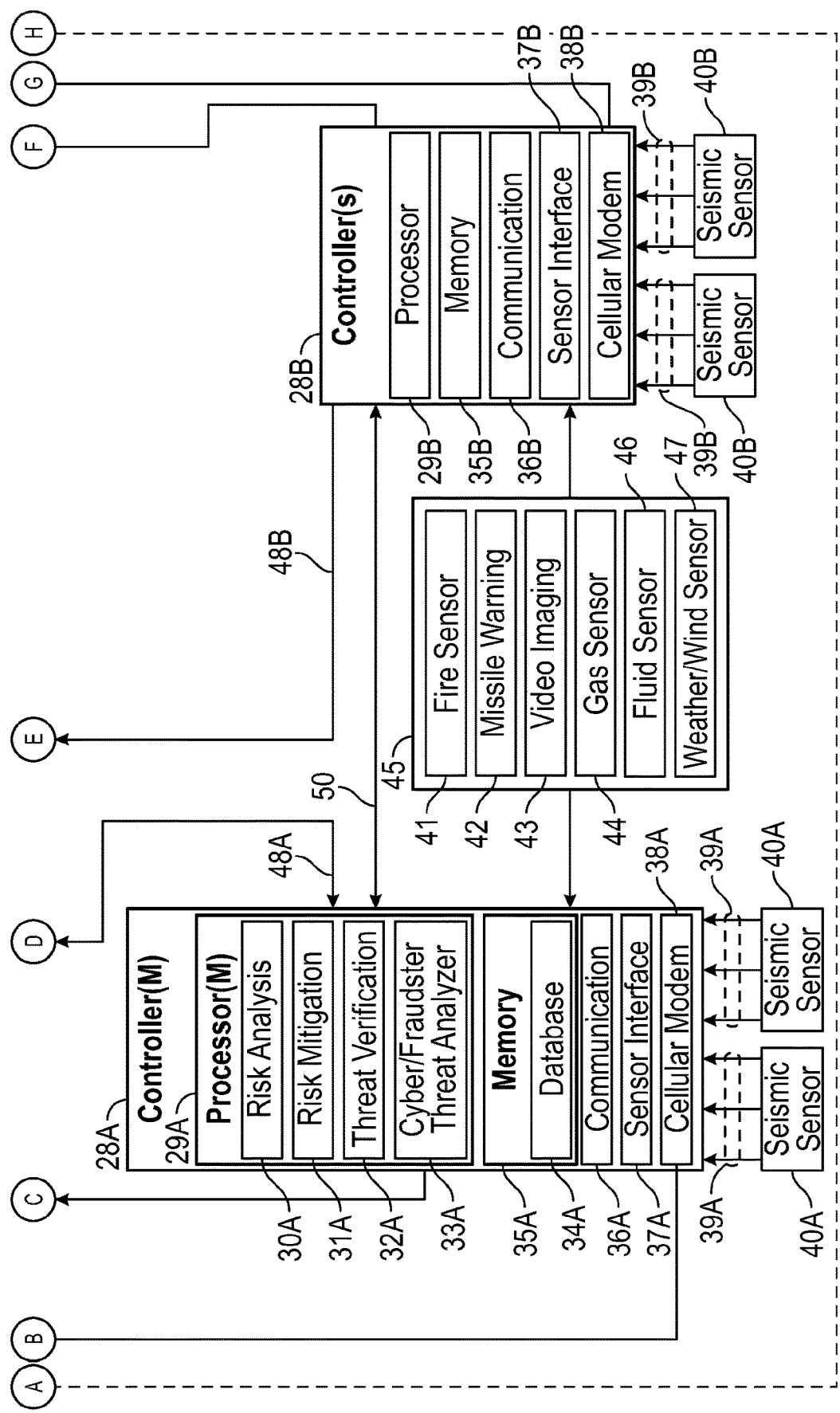

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim.

As used herein, terms such as "consisting of" and "composed of" limit the scope of a specific claim to the materials and steps recited by the claim.

All prior patents, publications, and test methods referenced herein are incorporated by reference in their entireties.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

A threat event as referred to herein may include an earthquake, a fire, a poisonous and/or flammable gas release, fluid flows such as water flooding and/or chemicals flowing from a ruptured chemical tank and/or line, and/or a military action, such a missile strike on civilian buildings and infrastructure. The threat event may also be referred to herein as a catastrophic event or a disaster.

An actual occurrence of a threat event may result in gas explosions, fires, floods, in and/or around a building, and/or damage to the structure of a building, such a collapse of portions of the buildings and/or deformations in the walls and/or doorframes. A deformation in the walls may prevent closed doors and/or closed windows from opening trapping people and/or animals within the damaged building resulting in injuries and/or deaths by preventing a time-critical evacuation.

Embodiments of the present disclosure herein disclose methods and systems for managing safety devices in a building during a detection of a threat event. An electronic controller may be configured to receive environmental sensor data from environmental condition detection sensors. The controller may detect from the environmental sensor data, an imminent occurrence of a threat event that would cause damage to the building. The controller may use a risk analysis model to analyze the imminent threat and to generate at least one risk mitigation action that reduces the damage to the building during the actual occurrence of the threat event. The controller may transmit, prior to the actual occurrence of the threat event, risk mitigation instructions to a plurality of actuators that respectively control a plurality of safety devices so as cause at least one operational state change in each of the plurality of safety devices. For example, upon assessing that a major earthquake may strike a geographical region, the controller may cause some or all of the doors in a building to open using a door related safety device.

A plurality of safety devices may be integrated into the building so as to reduce injuries, causalities, deaths and/or damage to the building during the actual occurrence of a threat event. The configuration and/or number of safety devices deployed in the building may depend on the structure type of the building (e.g., single home, small apartment building, or skyscraper), the construction material used in the building, and/or the properties of a substrate under the building, such as the geological strata, structure and topology, and ground elasticity, for example.

In some embodiments, the plurality of safety devices may include a gas valve, a water valve, an elevator controller, a siren controller, and an electrical panel controller. The plurality of safety devices may be electrically controlled through a respective plurality of actuators that are computer-controlled.

FIG. 1 is a system block diagram of a system 1 for managing safety devices in a building during the detection of a threat event in accordance with one or more embodiments of the present disclosure. System 1 may include a plurality of safety devices, environmental condition detection sensors 45, a first controller 28A, a second controller 28B, and interface circuitry 23. The first controller 28A and the second controller 28B may communicate with each other directly over a fiber optical cable 50. The first controller 28A, the second controller 28B, and the interface circuitry 23 may communicate with each other over a landline 48A and 48B, for example.

The first controller 28A and the second controller 28B may also be referred to herein as a response controller for generating risk mitigation actions in response to detecting an imminent occurrence of a threat event.

In some embodiments, the plurality of safety devices may include, but are not limited to, a door related safety device 8 with an actuator 14, a gas valve 9 with an actuator 15, an elevator safety device 10 with an actuator 16, a siren 11 with an actuator 17, an electric panel safety device 12 with an actuator 18, and a water valve 13 with an actuator 19.

In some embodiments, the door related safety device 8 may include a door opener device 20, a door latch opener 21, and a door bolt opener 22. The door related safety device 8 may be configured to open a closed door by opening the door latch with the door latch opener 21, to unlock the lock bolts with the door bolt opener 22, and to push the door open using the door opener device 20. In some embodiments, each door related safety device 8, such as the door opener device 20, the door latch opener 21, and the door bolt opener 22, may each be controlled by its own separate actuator.

The terms safety device, or actuator-controlled safety device, may be a passive mechanical element like a gas valve, fluid valve, and/or water valve, for example, that is electrically controlled using an actuator to change its operational state. The actuator may be configured to receive control commands from the actuator controller 24 and to mechanically change the operational state of these passive element safety devices through a motor, for example, in response to the control command. For example, in a gas valve, the motor of the actuator may open or close the gas valve. In other embodiments, the actuators may receive a control command that cause an operational state change in an electrical-based safety device such as the siren 11 to sound an alarm signal, for example. Each safety device may typically include the actuator to receive control commands for changing its operational state as shown in FIG. 1.

In some embodiments, the first controller 28A denoted CONTROLLER M may include a processor 29A, a memory 35A, communication circuitry 36A for communicating over a communication network (e.g., Wi-Fi, wired ethernet, for example), sensor interface circuitry 37A for receiving data from environmental condition detection sensors 45, and a cellular modem 38A for communication over a cellular network. Similarly, the second controller 28B denoted CONTROLLER S may include a processor 29B, a memory 35B, communication circuitry 36B for communicating over a communication network (e.g., Wi-Fi, wired ethernet, for example), sensor interface circuitry 37B for receiving data from environmental condition detection sensors 45, and a cellular modem 38B for communication over a cellular network.

In some embodiments, memory 35A and memory 35B may be configured to respectively store a database 34A and a database 34B.

In some embodiments, cellular modems 38A and 38B may be approved by an Institute of Standards.

In some embodiments, processor 29A, processor 29B, or both may be configured to execute computer software routines or modules such as a risk analysis model 30A, a risk mitigation module 31A for generating risk mitigation actions, a threat verification module 32A for correlating environmental condition sensor data at multiple geographic locations, and a cyber/intruder threat analyzer module 33A. Similarly, but not shown in FIG. 1 for brevity, processor 29B may be configured to execute computer software routines or modules such as a risk analysis model 30B, a risk mitigation module 31B for generating risk mitigation actions, a threat verification module 32B for correlating environmental condition sensor data at multiple geographic locations, and a cyber/intruder threat analyzer module 33B.

In some embodiments, the controllers 28A and 28B may be configured to utilize the risk analysis model 30A and 30B to analyze threat event related environmental condition sensor data to predict a risk value (e.g., risk probability) that the threat event would cause damage to a building, and to generate at least one risk mitigation action (e.g., using the risk mitigation module 31A and 31B) that at least reduces the damage to the building during the actual occurrence of the threat event. The risk mitigation actions may be based in part on a structure type of the building (e.g., an old building, a new building, single home, small apartment building, or skyscraper), construction material of the building (e.g., wood, plaster, brick, metal, ceramic, cement, clay, concrete, foams, glass, cement blocks, steel beams, sand, rock), and positions of each of the plurality of the safety devices within the building.

In some embodiments, the controllers 28A and 28B may be configured to cause to transmit, prior to the actual occurrence of the threat event, based on the at least one risk mitigation action, each respective risk mitigation instruction to each respective actuator (e.g., actuators 14-19) of the plurality of actuators so as to cause at least one operational state change of each respective safety device (e.g., safety devices 8-13) of the plurality of safety devices so as to at least reduce the damage to the building from the threat event.

In some embodiments, system 1 may include dedicated control software that is configured to receive data from the seismic sensors, fire detection systems, and/or missile detection systems, to perform a reliability test between the two controllers as described below, and to perform risk mitigation actions or emergency operations in the building based on a situation table (as described later in Table 1).

In some embodiments, all of the functionality of the system 1 may be performed by one controller. In this case, the elements of the system 1 may be referred to herein for clarity without an A or B designation, such as for example, the controller 28 with memory 35.

In some embodiments, for reliability and validation, two separate controllers may be used as shown in FIG. 1. The two separate controllers may be remotely located. For example, two separate controllers, one acting as a Master (e.g., CONTROLLER (M)) and the other as a slave (e.g., CONTROLLER (S)) may be located at two locations in the building such as, for example, at a first side and at a second side of the building. In some embodiments, the first and second sides may be substantially opposite to one another, for example. When an imminent threat is detected, the threat verification module 32A and/or 32B may assess whether the imminent threat is valid if the first controller 28A and the second controller 28B detect the same imminent threat by correlating environmental condition sensor data from environmental condition detection sensors located at the two sides of the building.

In some embodiments, the system 1 may be subject to cyber and/or intruder attacks such as by a third-party taking control of the system, or neutralizing the system by introducing a virus, for example. The cyber/intruder threat analyzer module 33A and/or 33B may identify these attacks when one of the controllers detect an imminent threat (e.g., an intruder may initiate an attack on that one controller), but the other controller does not, for example.

In some embodiments, the first controller 28A, the second controller 28B, or both may be a programmable logic controller (PLC).

In some embodiments, the system 1 may include environmental condition detection sensors 45 that may include a fire sensor 41, a missile warning sensor 42, a video imaging unit 43, a gas sensor 44, a fluid sensor 46, a weather/wind sensor 47, and/or seismic sensors denoted 40A and 40B. Each of these environmental condition detection sensors may be configured to measure environmental data related to at least one environmental condition that may cause damage to the building such as weather, heat, wind, gas, seismic vibrations, incoming missiles, fluid leaks, for example, related to environmental conditions and to generate environmental condition sensor data based on the environmental data.

In some embodiments, a plurality of imaging units 43, such as a digital camera and/or a digital video camera may be positioned at various locations in and/or around the building to generate image data that may be monitored in real time by image processing algorithms to detect any structural irregularities and/or catastrophic occurrences such as fires, flood, trapped persons, in the building both before and during the actual occurrence of the threat event.

In some embodiments, seismic sensors 40A and/or 40B may include three ground or earth contacts 39A and 39B where each of three earth contacts may be configured to measure different seismic intensities that may be relayed to the controller 28A and 28B through the sensor interface 37A and 37B.

In some embodiments, the interface circuitry 23 may be used for converting digital signals from processor 29A and/or 29B to control signals that are coupled to an actuator controller 24 for controlling the plurality of actuators 14-19. The interface circuitry 23 may include the actuator controller 24, a digital-to-analog (D/A) converter 26, input/output interfaces 25, and communication circuitry 27 for communication with elements of the system 1. In some embodiments, the interface circuitry 23 may be a stand-alone block as shown in FIG. 1. In other embodiments, the interface circuitry 23 may be separated into a master and a slave block for redundancy and/or threat verification as in controllers 28A and 28B or partitioned into any number of suitable blocks that may be located at any suitable locations.

In some embodiments, system 1 may include a local facility control center (FCC) 7 that may provide computer displays for an operator to assess the operational states of the plurality of safety devices within the building.

In some embodiments, the system 1 may include a local threat management control (LTMC) system 6 that may include elements of the system 1 shown within a dotted rectangle 6. The portion of the elements of system 1 that are included in the LTMC system 6 may be located in and/or around the building, particularly when the building may include many living units and/or office units, or when the building may be skyscraper.

In some embodiments, controller 28A and/or controller 28B may be configured to communicate with a company control center 3 over cellular networks 49A and/or 49B respectively using cellular modems 28A and/or 28B. The company control center 3 may be that of a company which manages multiple threat management systems for managing safety devices in a plurality of buildings during threat event detection. The Company Control Center 3 may further receive alerts and/or relay warnings about the threat event between a National Seismological Center 2, a National Search and Rescue Unit 4, and/or a Government Civil Defense Unit 5. The Government Civil Defense Unit 5 may issue missile alert warnings to the system 1.

The system 1 shown in FIG. 1 is merely for conceptual clarity and not by way of limitation of the embodiments disclosed herein. Although the elements of the LTMC system 6 may be located in a single building, the elements of LTMC system 6 may be located in multiple buildings in a close geographical region, such as a neighborhood, or may be located on different floors in a tall building or skyscraper. The system redundancy may not be limited to the use of only two controllers and/or two sets of environmental condition detection sensors but may be any number that may be placed in any suitable locations. Each of the elements in system 1 may be located in any suitable location and are not limited to what is shown in FIG. 1 or in any of the other figures hereinbelow.

In some embodiments, seismic sensors 40A and 40B, for example, may be calibrated and adjusted in laboratories for installation in the least one building or other structures adhering to accepted standards set forth by appropriate governmental bodies.

In some embodiments, system 1 may implement protection mechanisms that will prevent burglary and intrusion into the building using the cyber/intruder threat analyzer module 33A and 33B.

Some embodiments may be implemented a system, method or computer program product. Accordingly, some embodiments may be implemented as an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments may be implemented as a computer program product with one or more computer readable medium(s) with computer readable program code.

In some embodiments, implementation of the method and/or system may involve performing and/or completing selected tasks manually, automatically, or a combination thereof. Moreover, according to actual instrumentation and equipment of some embodiments of the method and/or system disclosed herein, several selected tasks may be implemented in hardware, in software or in firmware and/or in any combination thereof, e.g., using an operating system.

In some embodiments, hardware for performing selected tasks may be implemented as a chip or a circuit. As software, selected tasks may be implemented as a plurality of software instructions being executed by a computer using any suitable operating system. The selected tasks may be performed by a data processor, such as a computing platform for executing a plurality of instructions. Additionally, and/or optionally, the data processor may include a volatile memory for storing instructions and/or data and/or a non-volatile storage, for example, a magnetic hard-disk and/or removable media, for storing instructions and/or data. Optionally, a network connection may be provided as well. The system 1 may include a display and/or a user input device such as a keyboard or mouse.

Any combination of one or more computer readable medium(s) may be implemented. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any combination thereof.

In some embodiments, the computer readable storage medium may include an electrical connection having at least one wire, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof.

A computer readable signal medium may include a propagated data signal with computer readable program code, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code on a computer readable medium and/or data may be transmitted using any appropriate medium, including but not limited to wireless, wireline, optical fiber cable, RF, etc., or any suitable combination of the foregoing.

In some embodiments, computer program code for carrying out operations for some embodiments of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In other embodiments, the remote computer may be connected to the user's computer through any type of network, including a local area network (LAN) or a wide area network (WAN), or the connection may be made to an external computer (for example, through the Internet using an Internet Service Provider).

Some embodiments of the present disclosure may be described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a special purpose computer, or other programmable data processing apparatus to implement a machine, such that the instructions, which when executed by the processor of the computer or other programmable data processing apparatus, causes the processor to implement the functions and/or acts specified in the flowchart and/or block diagram block or blocks.

These computer program instructions may be stored in a computer readable medium that may cause a computer, other programmable data processing apparatus, or other devices to function in a particular manner. The instructions stored in the computer readable medium may produce an article of manufacture including instructions which implement the function and/or act specified in the flowchart and/or block diagram block or blocks. The computer program instructions may be loaded onto a computer, other programmable data processing apparatus, or other devices to cause a series of operational steps to be performed on the computer, other programmable apparatus or other devices to produce a computer implemented process such that the instructions which when executed on the computer or other programmable apparatus enables processes for implementing the functions and/or acts specified in the flowchart and/or block diagram block or blocks.

Figure 2:
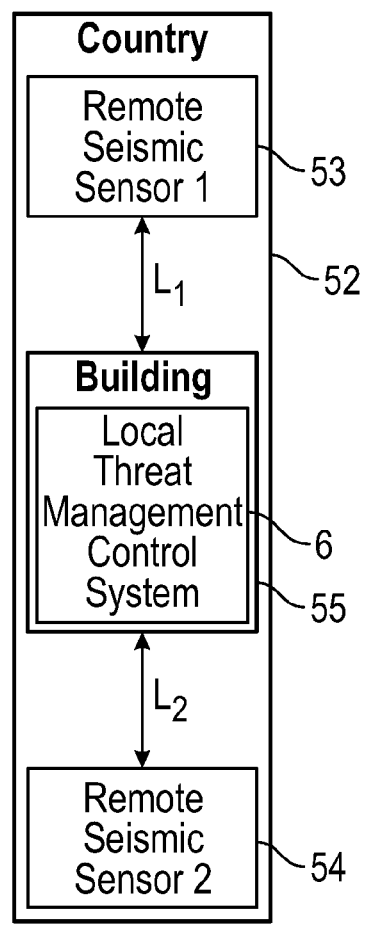
FIG. 2 is a diagram of seismic sensors for seismic measurements in a geographical region in accordance with one or more embodiments of the present disclosure.

FIG. 2 is a diagram of seismic sensors for seismic measurements in a geographical region 52 in accordance with one or more embodiments of the present disclosure. FIG. 2 illustrates an exemplary rectangular map of the geographical region 52 such as a country. A remote seismic sensor1 53 may be located at a northern side of the geographical region 52. A remote seismic sensor2 54 may be located at a southern side of the geographical region 52. The remote seismic sensor1 53 and/or the remote seismic sensor2 54 may communicate with the LTMC system 6 in a building 55. The remote seismic sensor1 53 may be a distance of $L_1$ from the LTMC system 6 in the building 55 and the remote seismic sensor2 54 may be a distance of $L_2$ from the LTMC system 6 in the building 55. $L_1$ and $L_2$ may be on the order of hundreds of kilometers, for example, from the LTMC system 6 in the building 55. As a result, seismic events at the remote seismic sensor1 53 and/or the remote seismic sensor2 54 may be useful for detecting and/or predicting an imminent occurrence of an earthquake affecting the building 55. The remote seismic sensor1 53 and the remote seismic sensor2 54 are different from seismic sensors 40A and 40B in the LTMC system 6 as shown in FIG. 1.

Figure 3A:
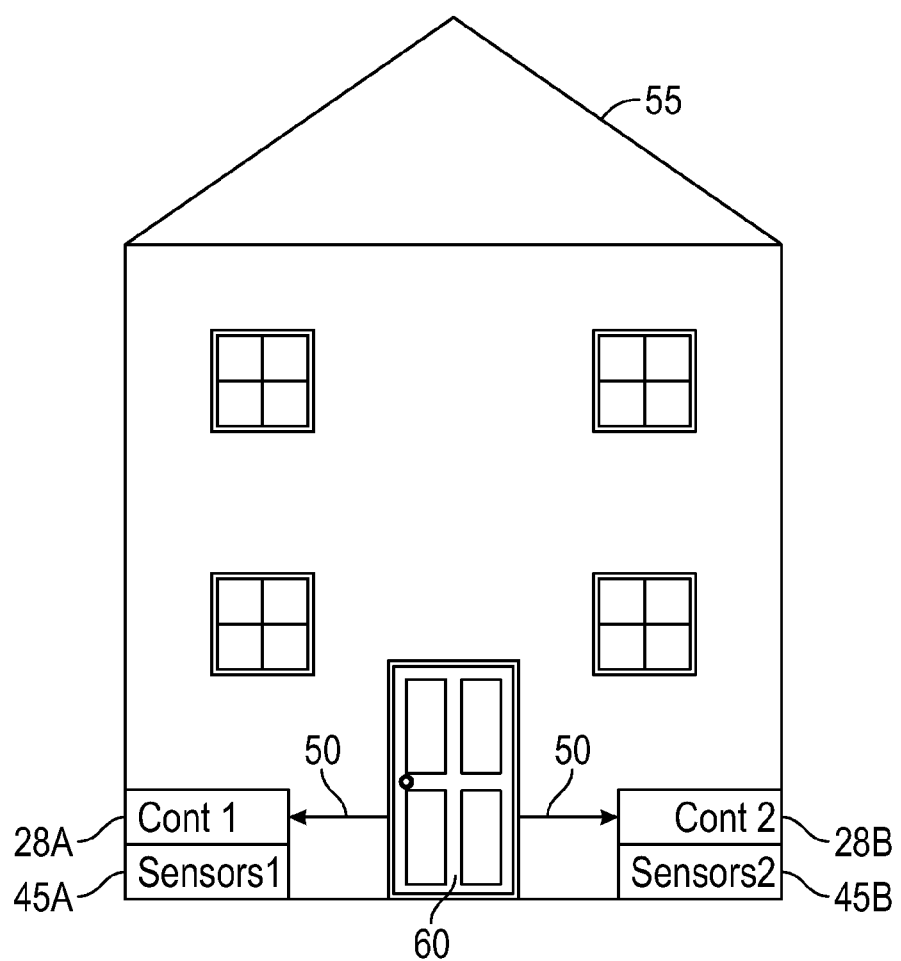
FIGS. 3A-3C are diagrams of a system for managing safety devices in different types of building configurations in accordance with one or more embodiments of the present disclosure.
Figure 3B:
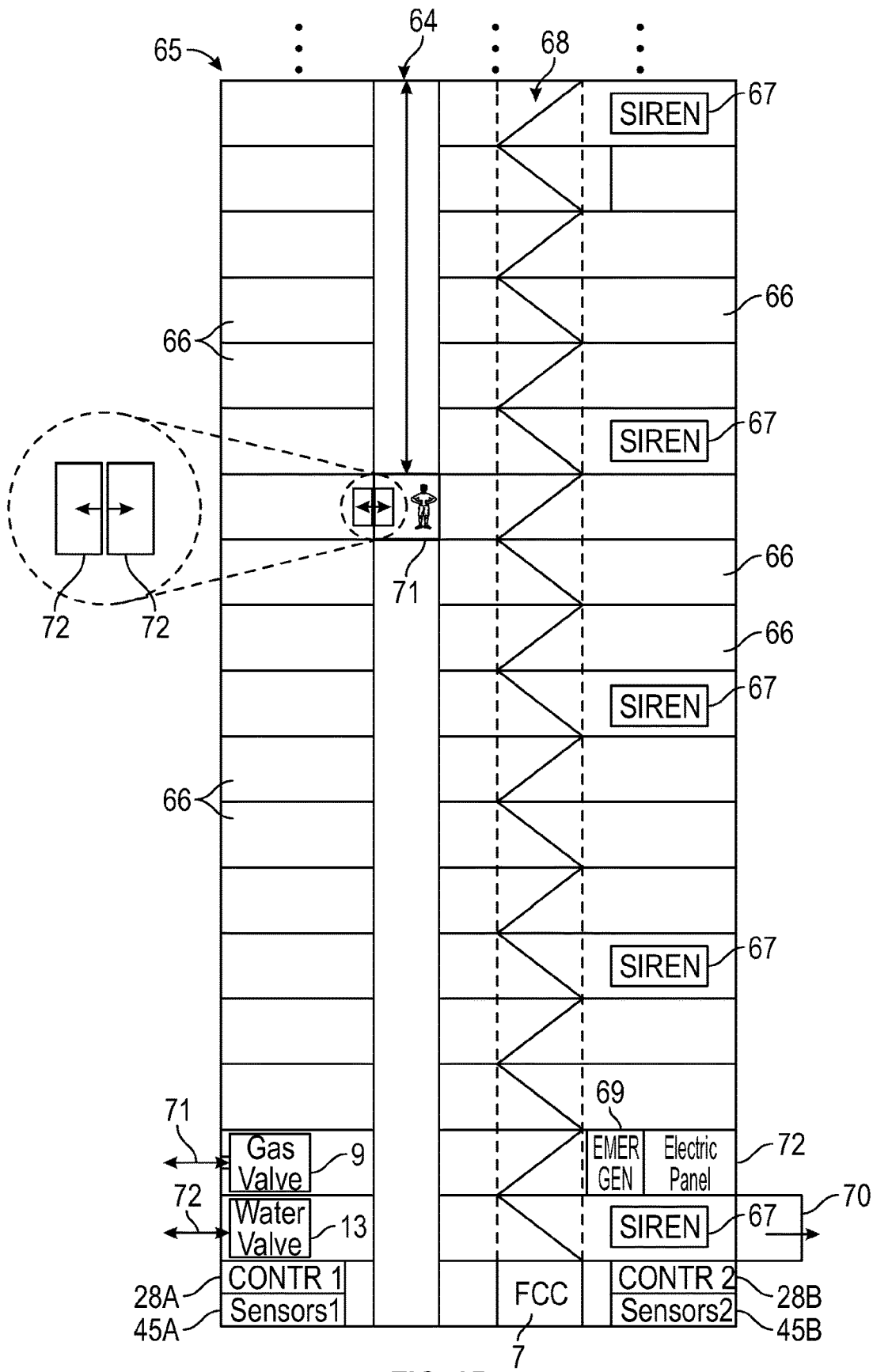
Figure 3C:
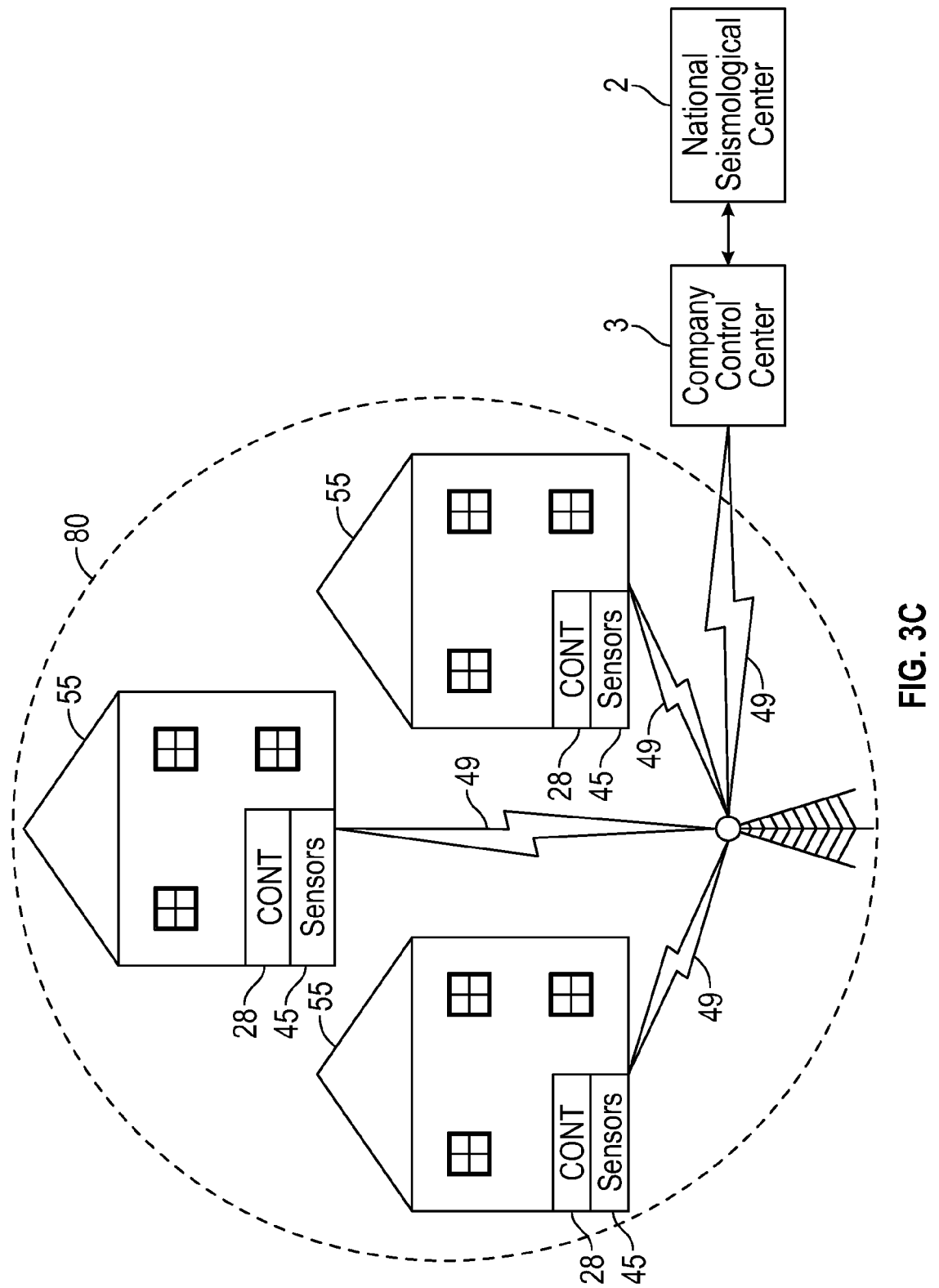

FIGS. 3A-3C are diagrams of a system for managing safety devices in different types of building configurations in accordance with one or more embodiments of the present disclosure.

FIG. 3A illustrates a house 55 with a door 60 with controller1 28A and sensors1 45A of the LTMC system 6 located on the left side of the house and controller2 28B and sensors2 45B located on the right side of the house 55. The optical fiber 50 may communicatively couple controller1 28A and controller2 28B to each other.

FIG. 3B illustrates an exemplary embodiment of a skyscraper 65. Elements of the LTMC system 6 may be distributed across different floors 66 of the skyscraper 65. For example, when the LTMC system 6 detects an imminent occurrence of a threat such as an earthquake, the elevator safety device 10 also referred to herein as an elevator controller may be configured to cause an elevator 71 in an elevator shaft 64 to stop at a nearest floor 66 and open doors 72 of the elevator 71 as shown in the inset. In addition, the siren safety device 11 may cause sirens 67 on different floors 66 to sound an alarm signal. An electrical panel safety device 12 may be configured to cut the power off in the building 65 from the mains power line and turn on an emergency generator 69 to activate emergency lights throughout the building, for example, in a stairwell 68. A gas valve 9 connected to the main gas line 71 may be turned off. A water valve 13 connected to the main water line 72 may be turned off.

FIG. 3C illustrates an exemplary embodiment of a small neighborhood 80 or group of buildings 55. Each building 55 may include the LTMC system 6 with a controller 28 and sensors 45. However, each building 55 may be configured to communicate with one another over a cellular communication network 49 through the cellular modem 38 to receive and send alerts of an imminent occurrence of the threat event detected by sensors in any of the buildings 55 or from the company control center 3 or from the National Seismological Center 2.

Figure 4:
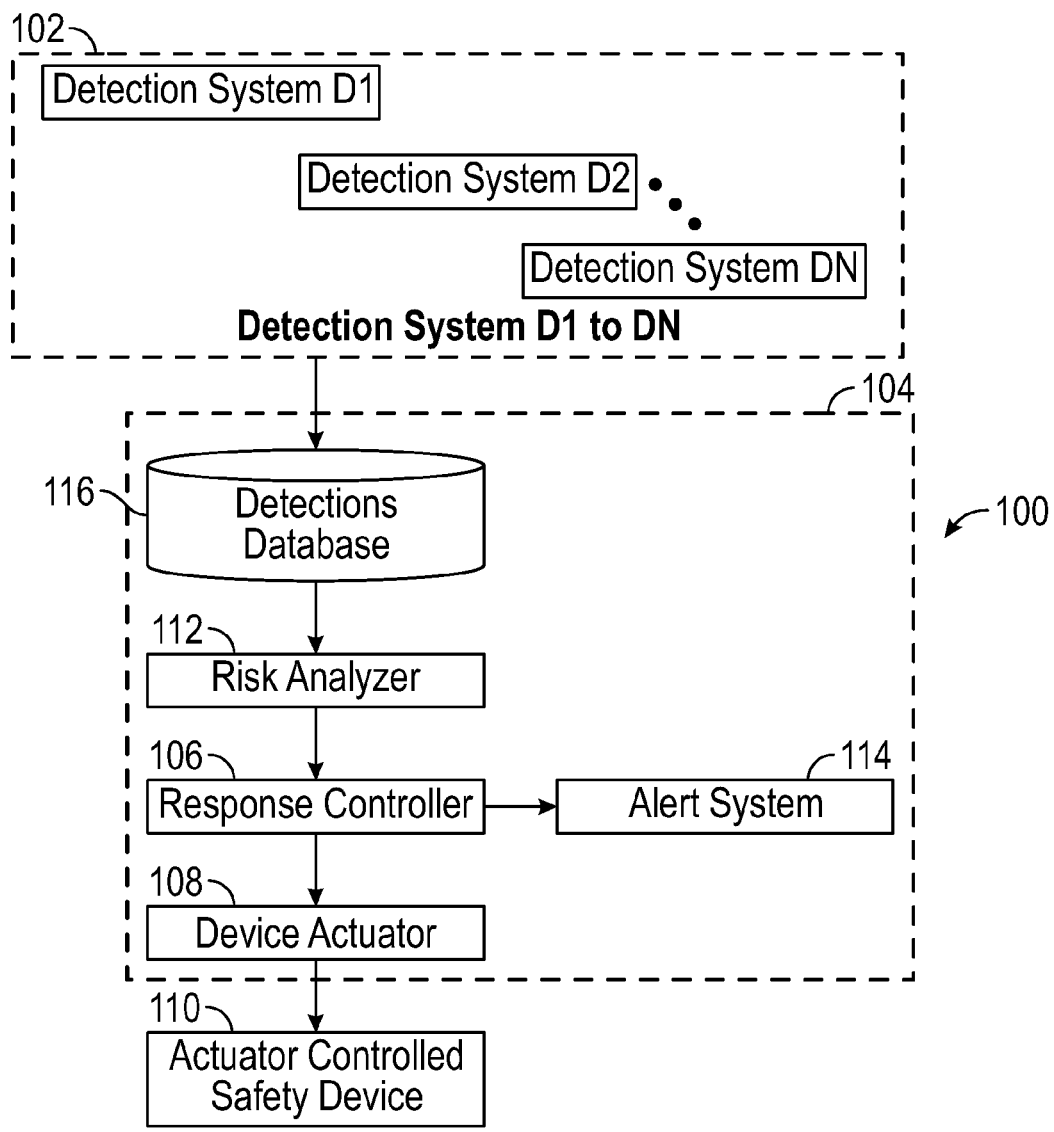
FIG. 4 is a schematic diagram of second embodiment of a system for managing safety devices in a building during the detection of a threat event in accordance with one or more embodiments of the present disclosure.

FIG. 4 is a schematic diagram of second embodiment of a system 100 for managing safety devices in a building during the detection of a threat event in accordance with one or more embodiments of the present disclosure. System 100 may include detection systems 102 for identifying the threat event and a response system 104 for responding to the threat event in order to mitigate damage risk at a target location. The terms target location or target zone may refer to the building or region immediately around the building on which the risk analysis of the imminent occurrence of the threat event may be performed.

In some embodiments, the system 100 may include data exchange between the detection systems 102, where each detection system is denoted $D_1$ to $D_n$, where n is an integer, and the response system 104. In some embodiments, the response system 104 may include a response controller 106, which controls actuator devices 108 that may subsequently control (actuator-controlled) safety devices 110 such as a door related safety device 8 in the building so as to prevent a catastrophe.

In some embodiments, the system 100 may include a risk analyzer 112 (e.g., risk analysis model 30A and 30B). The risk analyzer 112 may include may receive detection data (e.g., environmental condition sensor data) and outputs data about a potential risk of a catastrophe due to an imminent occurrence of the threat event.

In some embodiments, response controller 106 may receive the output data from the risk analyzer 112. In some embodiments, the response controller 106 may be activated ("wakes-up") when data receive from risk analyzer 112 indicates a risk probability higher than a threshold that is indicative of an imminent occurrence of the threat event. The risk probability may also be referred to as a risk value.

In some embodiments, the response controller 106 may generate at least one risk mitigation action in accordance with the risk probability received from the risk analyzer 112 for reducing the damage to the building during the actual occurrence of the threat event. For example: the at least one risk mitigation action may include setting the door related safety device 8 to an unlocked operational state depending on the safety scenario in order to reduce risk. The door related safety device 9 may be disabled where the door remains in operational state of being open and unlocked, in order to reduce risk.

In some embodiments, a catastrophe may be prevented by causing an alert or alarm (e.g., the siren 67) to be sounded by outputting the at least one risk mitigation action to an alert system 114.

In some embodiments, an operator such as in the local FCC 7 may receive an alert and manually actuate the door related safety device 8, or alternatively, manually operate the device actuator 108 to change the operational state of the door related safety device 8 to reduce the risk of catastrophe. In some embodiments, the operator may be a resident in the building. In some embodiments, the operator may be a professional or a person assigned to manually actuate the door related safety device 8 or the device actuator 108 (or the actuators 14-19 in FIG. 1).

In some embodiments, the system 100 may include a detections database 116 (e.g., database 34A and/or 34B in FIG. 1). The detections database 116 may be generated and updated by the response system 104. In other embodiments, the detections database 116 may be generated and updated by the detection systems 102. In yet other embodiments, detections database 116 may receive the detection data from the detection systems 102. In some embodiments, the risk analyzer 112 may exchange detection data with detections database 116.

In some embodiments, some detection systems may be differentiated from each other by their sensing technology. The detection systems 102 may indicate the imminent occurrence of catastrophic conditions during the actual occurrence of the threat event. In some embodiments, the detection systems 102 may indicate the imminent occurrence of catastrophic conditions during the actual occurrence of the threat event at least 1 minute prior to the actual occurrence. In other embodiments, the detection systems 102 may indicate the imminent occurrence of catastrophic conditions during the actual occurrence of the threat event at least 10 minutes prior to the actual occurrence. In yet other embodiments, the detection systems 102 may indicate the imminent occurrence of catastrophic conditions during the actual occurrence of the threat event at least 30 minutes prior to the actual occurrence. In yet other embodiments, the detection systems 102 may indicate the imminent occurrence of catastrophic conditions during the actual occurrence of the threat event at least 30 seconds prior to the actual occurrence. In yet other embodiments, the detection systems 102 may indicate the imminent occurrence of catastrophic conditions during the actual occurrence of the threat event at least 10 seconds prior to the actual occurrence. In yet other embodiments, the detection systems 102 may indicate the imminent occurrence of catastrophic conditions during the actual occurrence of the threat event at least 5 seconds prior to the actual occurrence. In yet other embodiments, the detection systems 102 may indicate the imminent occurrence of catastrophic conditions during the actual occurrence of the threat event at least 1 seconds prior to the actual occurrence. In yet other embodiments, the detection systems 102 may indicate the imminent occurrence of catastrophic conditions during the actual occurrence of the threat event at least 0.5 seconds prior to the actual occurrence.

Each of the detection systems 102 may include environmental condition sensors of a different type in measuring different physical phenomena and/or different values of a physical phenomenon. The environmental condition sensor may measure physical phenomena including vibration, fluid concentration, and optical values. In some embodiments, the detection systems 102 may differ in the frequency measurement rate. Each of the detection systems 102 may include detection devices (e.g., the environmental condition sensors) that measure one or more physical phenomena. The data recorded by the detection systems 102 may include for example: Time/data, GPS coordinates, data type, value, and/or a state of the environmental condition sensor (e.g. valid/invalid).

In some embodiments, the detection systems 102 may include environmental condition sensors located remote of a facility which is nearby the plurality of safety devices. In some embodiments, the term remote may be defined herein as outside a facility having the plurality of safety devices, outside a neighborhood that includes the plurality of safety devices, outside a town that includes the plurality of safety devices, outside a country that includes the plurality of safety devices. In some embodiments, the detection systems 102 may include satellites. In some embodiments, the detection systems 102 may be located at a private facility.

In some embodiments, the detection systems 102 may be located at a municipal facility. In some embodiments, the detection systems 102 may be located at a government facility.

In some embodiments, the detection systems 102 may be located at a facility dedicated to providing detection data to other locations, for example, a seismographic institute (e.g., the National Seismological Center 2 in FIG. 1).

In some embodiments, the detection systems 102 may include a detection device (e.g., environmental condition sensor) located at a top portion of a building. Having a detection device at a high level (for example, floor 66 that is high in skyscraper 65 in FIG. 3B) may increase the quality of measurements (e.g. resolution of movements, vibrations, etc.). Having detection device at a high level may increase the protection of the environmental condition sensor during the actual occurrence of the threat event that may occur at a lower level of the building (e.g. floods/gas). A location of the detection systems 102 at a high level may improve a transmission of data to a remote receiving system such as over a cellular network.

In some embodiments, the detection systems 102 may include a detection device located at a low level of the building. Having the detection device at a low level may increase the quality of measurements (e.g. when measuring phenomena that tend to occur at a low level, such as fluid flow leak, or a heavy gas leak). Having detection device at a low level may increase the potential protection of the device in case of catastrophe that may occur at a high level (such as a risk of building collapse). A location of the detection systems 102 at a low level may enable wired transmission of data to a receiving system.

In some embodiments, the detection systems 102 may include a detection device (e.g., a controllable safety device) located within walls of a building. In some embodiments, detection device may be attached to a wall or a construction part of a building.

In some embodiments, the detection devices may be portable. In some embodiments, the detection devices may be positioned in a moving object, such as in a vehicle, or in a mobile personal device. A potential advantage of using a portable detection device may be the high availability of such devices as used by a large population. In other embodiments, portable devices may enable a distributed detection by deploying the detection devices (e.g., sensors 45) in each building 55 in the neighborhood 80 as shown in FIG. 3C, for example.

In some embodiments, the detections database 116 may aggregate the detection data of the detection systems 102. Auxiliary data may be processed from the detection data that may be added to the detections database 116. The auxiliary data may include, for example, detection data priority, distance from a target zone, and/or data quality.

In some embodiments, the detection database 116 may be stored in a computing unit located remote of a facility which is nearby a safety device deployed in the building. In some embodiments, the detection database 116 may be in a cloud computing system. In some embodiments, the detection database 116 may be located at a private facility. In some embodiments, the detection database 116 may be located at a municipal facility. In some embodiments, the detection database 116 may be located at a government facility. In some embodiments, the detection database 116 may be located at a facility dedicated to providing detection data to other location, for example: a seismographic institute.

In some embodiments, the use of the detection database 116 may involve purchasing or renting access rights. In some embodiments, read access to the detection database 116 may be through a licensed service. In some embodiments, a payment for reading the detection database may be according to an amount of transferred data that is read from the detection database 116 by a computing device of a third-party entity. In some embodiments, payment for reading the detection database may be limited to time/dates data entries. In some embodiments, a frequency that the data is read may change the payment for reading data from the detection database 116.

In some embodiments, the risk analyzer 112 may exchange detection data with the detection database 116.

In some embodiments, a computing system that includes the risk analyzer 112 may receive the detection data and determine the imminent occurrence of the threat event that may result in a catastrophe.

In some embodiments, a risk probability may be determined by comparing a detection data parameter to a respective risk threshold value. In some embodiments, the risk probability may be calculated by integrating and/or fusing data from the detection systems 102 as described elsewhere herein. In some embodiments, the risk probability may be calculated by using a risk analysis model such as the risk analysis model 30A and 30B based on an algorithm that receives as an input the measured data (e.g., from the environmental condition detection sensor) to which a normalization and integration function may be applied.

In some embodiments, the calculated risk value may include evaluating measured values and historical reliability of the detection systems 102. In some embodiments, the calculated risk value may include evaluating measured values and a distance between the detection systems 102 and a target location (e.g., the location of the building). The distance may be $L_1$ and $L_2$ as in FIG. 2, for example. In some embodiments, the calculated risk value may include evaluating measured values and type of measurements. In some embodiments, the calculated risk value may give an indication of how imminent is the actual occurrence of the threat event, and/or an indication as to what extent the actual occurrence of the threat event will result in damage to the building at the target location.

In some embodiments, the risk analysis model 30A and 30B may include a machine learning model. In some embodiments, the machine learning model may be trained using a training dataset with input data vectors including environmental condition data generated from the environmental condition detection sensors and output data vectors including probability values of the imminent occurrence of the threat event, a level of anticipated damage to the building at the target location, and/or at least one risk mitigation action that at least reduces the damage to the building during the actual occurrence of the threat event. In some embodiments, the training dataset may include datasets for a plurality of threat event types and/or catastrophe types. In some embodiments, training the machine learning model for a plurality of detection systems may be performed over by a variety of combinations of a plurality of detection systems (e.g., connected, operating, and/or available detection systems). Some of the data analysis algorithms may include data fusion, fuzzy logic, scoring, for example.

In some embodiments, data received from the detection systems 102 may be processed to detect anomalies. For example, failures and/or missed measurements may occur during a catastrophe.

In some embodiments, some of the plurality of safety devices that are controlled by a respective plurality of actuators may include at least one door-related safety device such as a door opener safety device and/or door latch and bolt opener devices both of which may be configured to operate in tandem so as to unlock the door and to push the door open out of the doorframe. In other embodiments, the locking devices may be opened by the at least one door-related safety device during the actual occurrence of the threat event. The locking devices may include for example, door locks, windows locks, vehicle locks, keyless locks, remotely controlled locks, Wi-Fi/cellular controlled locks, magnetic controlled locks, acoustic controlled locks, and/or light operated locks.

In some embodiments, one risk mitigation action may include unlocking these electronically controlled lock devices and deactivating their respective actuators controlling these electronically controlled lock devices to maintain them in an unlocked operational state, which may allow a space in the building to be evacuated during the actual occurrence of the threat event.

In some embodiments, the device actuators 108 may electronically control fluid valves. The fluid valves may include for example, gas valves and liquid valves. Some examples of the electronically controlled fluid valves may be remote controlled valves, Wi-Fi/cellular controlled valves, magnetic controlled valves, acoustic controlled valves, and/or light operated valves.

In some embodiments, one risk mitigation action may include the device actuator 108 disabling the option of turning on or off a fluid line or an outlet by the fluid valves (such as water valves 13), so that a space may be free of poisonous fluid or a fluid overflow (e.g., water flooding). In some embodiments, the fluid valve may be turned on or off into a safety operational state before the device actuator 108 disables the option of turning on or off the fluid valve.

In some embodiments, one risk mitigation action may include the device actuator 108 disabling electrical power in the building by disconnecting a power source (e.g., electric power 12) such as a mains power line to the building.

In some embodiments, the deactivation of the electronically controlled safety devices controlled by the device actuator 108 may be implemented by a wireless transmission of a de-activation signal from the response controller 106 to the device actuator 108 controlling the operational state of the safety device. In some embodiments, deactivating the device actuator 108 may be implemented by an electrical signal transmitted by wires electrically connected to the safety device.

In some embodiments, the alert system 114 may transmit a catastrophe alert. Following the alert, a person may manually change the operational state of the safety devices in accordance with risk mitigation actions. The manual implementation of the risk mitigation actions may be followed by a confirmation by the person which received the alert and implemented the risk mitigation action. In some embodiments, the confirmation may by transmitted in communications between parties receiving the alert and professional operators.

In some embodiments, using a safety device configured to be used in the system 100 may involve purchasing and/or renting access to use the safety device in system 100. In some embodiments, using a safety device configured to be used in the system 100 may involve purchasing or renting the safety device or safety device units related to its operation. In some embodiments, using a safety device configured to be used in the system 100 may involve purchasing or renting the safety device according to a licensed service. In some embodiments, using a safety device configured to be used in the system 100 may be limited by times, dates, and/or frequency of use.

FIG. 19 is a table (Table 1) showing risk mitigation actions for a seismic event in accordance with one or more embodiments of the present disclosure. Table 1 shows risk mitigation actions in a building such as a skyscraper to be performed before the actual occurrence of an earthquake at the target location. Seismic sensors 40A and/or 40B (FIG. 1), and/or remote seismic sensors 53 and 54 (FIG. 2) may detect seismic vibrations that may be assessed by controllers 28A and 28B as an imminent occurrence of an earthquake. The seismic sensors may assess the intensity level of the seismic vibration intensity as low power, medium power, or destructive power. The risk analysis model 30 may generate the risk mitigation actions to be performed on safety devices deployed in the skyscraper depending on the seismic vibration intensity as shown in Table 1.

When the threat event is an earthquake, seismic waves in an earthquake typically include a primary wave (P-wave) followed by a secondary wave (S-wave). The P-wave is compressional wave that travels at velocity of 6-8 km/sec about twice as fast than an S-wave traveling at a velocity of 3-4 km/sec. The S-wave are shear waves that displace the ground (e.g., the substrate under the building) perpendicular to the direction of propagation. The S-waves are the dangerous shear waves that typically causes the major damage to buildings and surrounding structures during earthquakes.

In some embodiments, seismic sensors 40A and 40B may be configured to detecting a seismic magnitude of the seismic P-wave. Depending on the magnitude of the detected P-wave, system 1 may use this data as an indication of an imminent occurrence of an earthquake. The risk analysis model 30A and 30B may identify that the magnitude of the P-wave was greater than a predefined threshold indicative of the level of damage. In some embodiments, three predefined thresholds may be used by the risk analysis model indicative of an imminent occurrence of an S-wave with intensity levels corresponding to the three vibration intensities shown in Table 1, for example. Thus, depending on the magnitude of the detected P-wave, system 1 may implement the three sets of risk mitigation actions shown in Table 1.

For example, before the actual occurrence of an earthquake identified as potentially having destructive power as shown in Table 1, the controllers 28A and 28B through the actuator controller 24 may instruct actuator 14 to activate the door opener device 20 after pulling the door tab (e.g., bolt opener 22) and opening the door latch 21 so as to automatically release the door from the door frame. The controllers 28A and 28B may additionally instruct actuator 19 to cause the water tap valve 13 to be closed and disconnected from the main water line 72, instruct actuator 15 to cause the gas valve 9 to be closed and disconnected from the main gas line 71, instruct actuator 18 to cause to turn on emergency lighting throughout the building 65 such as, for example, by activating the emergency generator 69, to cause the mains power to be disconnected in the electrical panel 12, and instruct actuator 17 to cause a flashing horn siren 67 to be activated throughout the building 65.

In some embodiments, the detection of the imminent occurrence of the threat event such as a low intensity earthquake, for example, indicates that a lower risk level of damage to a private home may occur, for example. If the risk mitigation module 31A and 31B sends a risk mitigation instruction to the door related safety device that causes the front door to open when the home owners are not home, more damage may be incurred by the owners from thieves stealing items from an open house. Hence, the risk mitigation module 31A and 31B needs to account for the type of building (e.g., skyscraper versus private home, for example) and the impact when triggering a risk mitigation action to reduce potential damage by the actual occurrence from a low intensity earthquake when the damage risk is low as illustrated in the above scenario.

In some embodiments, the seismic sensors 40A and 40B may be placed at different sides of the building to apply a coincidence criterion in comparing the seismic data from seismic sensors 40A to the seismic data from the seismic sensors 40B. In order to prevent such false alarms, an alert may be activated only when the two sensors separated by a distance of at least 15 meters detect a P-wave with a magnitude crossing predefined thresholds for triggering risk mitigation actions as shown in Table 1.

FIG. 20 is a table (Table 2) showing a listing of different cyber and intruder threats on the system 1 in accordance with one or more embodiments of the present disclosure. In some embodiments, system 1 may be subject to many types of cyberattacks, as well as intruder, burglar, and from other intrusion scenarios. The cyber/intruder threat analyzer 33A and 33B may be configured to analyze a whole range of threats of the system 1. Table 2 shows a number of threat descriptions, the affected systems within the overall system 1, the risk level (Low L, Medium M, and High H), the damage potential to system 1 (Low L, Medium M, and High H), and the realization probability (Low L, Medium M, and High H), such as the chance that a particular cyber and/or intrusion threat may occur in system 1.

In a first scenario (threat description #6) from Table 2, connecting a peripheral device through the I/O interfaces 25, such as a disk-on-key (DOK) that introduces a virus into system 1 has a high realization probability, a high-risk level, and a medium damage potential. In a second scenario (threat description #5), an intruder gaining control of the company control center 3 and/or the local facility control center (FCC) 7 has a high realization probability, a high-risk level, and a high damage potential to system 1.

Figure 5:
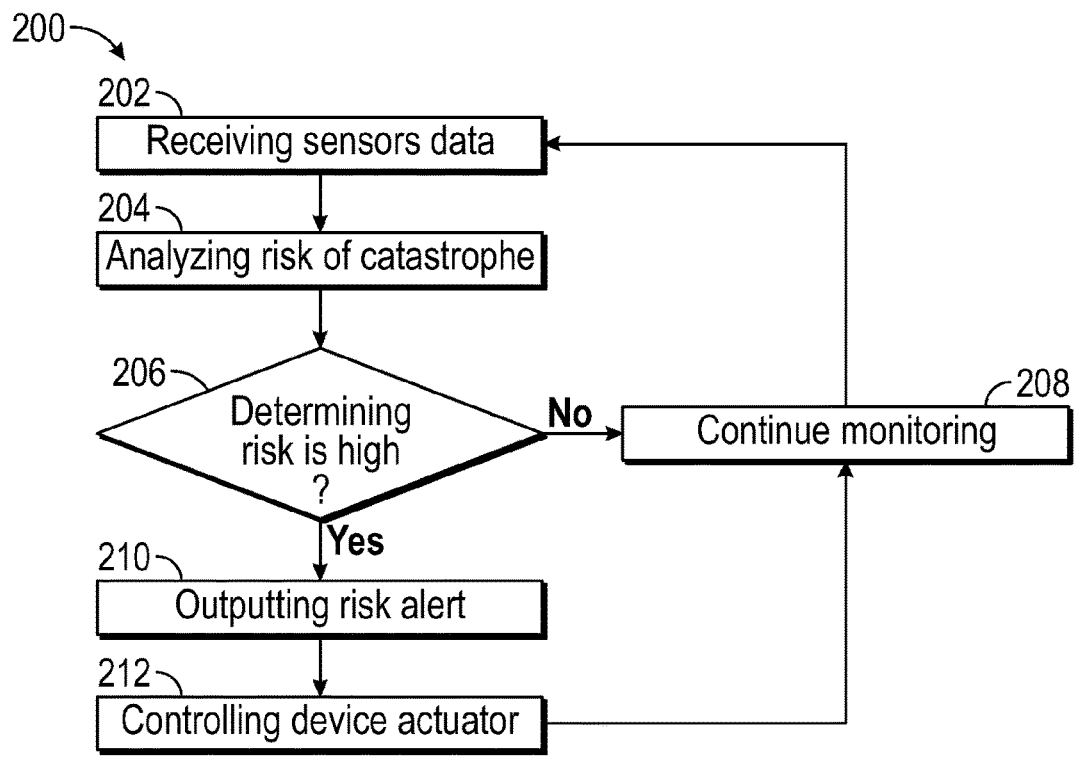
FIG. 5 is a first flowchart of a method for managing safety devices in a building during the detection of a threat event in accordance with one or more embodiments of the present disclosure.

FIG. 5 is a first flowchart of a method 200 for managing safety devices in a building during the detection of a threat event in accordance with one or more embodiments of the present disclosure. Method 200 may be performed by system 100 as shown in FIG. 4.

Method 200 may include receiving 202 sensors data. The sensors data (e.g., the environmental condition sensor data) may be received by data exchange with the detection systems 102. In some embodiments, where the detection systems 102 is a plurality of detection systems ($D_1, D_2, \ldots D_n$), the data exchange may be between any detection system from the plurality of detection systems.

Method 200 may include analyzing 204 risk of catastrophe. The risk, or a risk probability, may be calculated using a risk analyzer, or risk analysis model as described elsewhere herein.

Method 200 may include determining in a decision step 206 if risk is high. The risk probability may be considered as high if the risk probability is higher than a predefined risk probability threshold. In some embodiments, risk value may be a statistical value. In some embodiments, risk value may be a risk probability.

Method 200 may include continue monitoring 208 with receiving 202 sensor data.

Method 200 may include outputting 210 a risk alert. In some embodiments, an alert is optionally provided when risk is high.

Method 200 may include controlling 212 the device actuator 108 that controls the plurality of (actuator-controlled) safety devices 110 so as to reduce potential risk of damage during the actual occurrence of the threat by changing the operational states of the safety devices to reduce damage.

Figure 6:
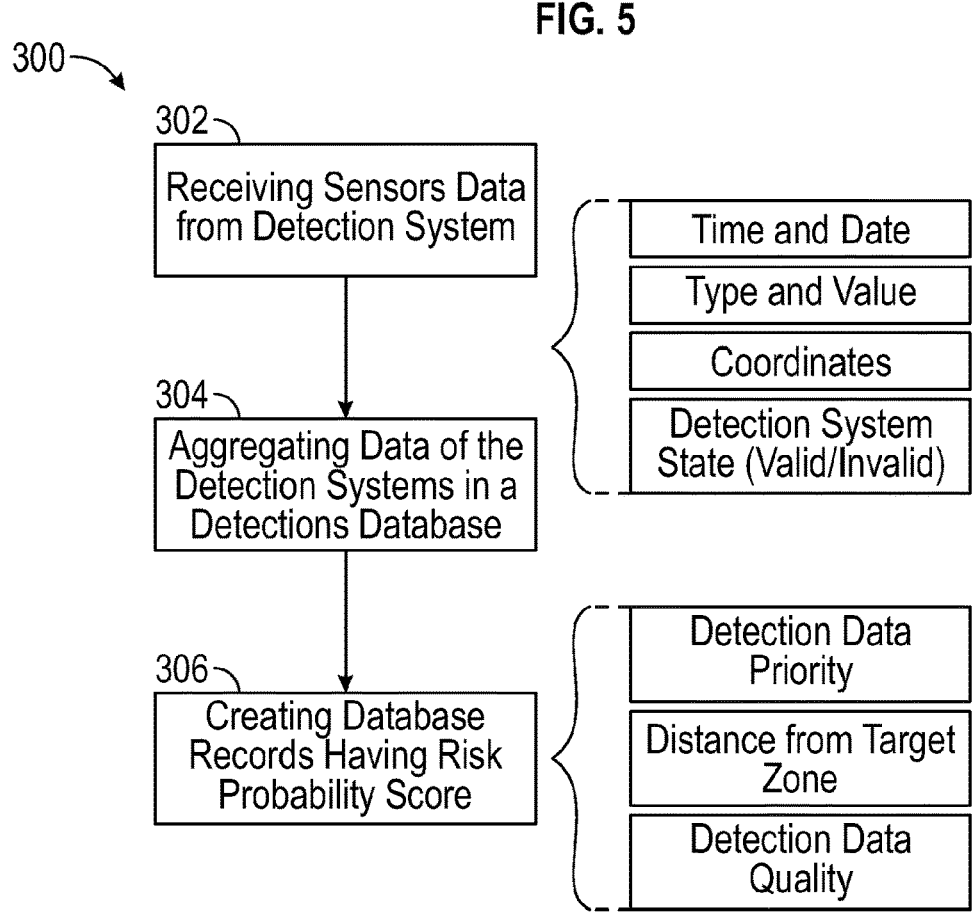
FIG. 6 is a flowchart of a method for managing data in a system for managing safety devices in a building during the detection of a threat event in accordance with one or more embodiments of the present disclosure.

FIG. 6 is a flowchart of a method 300 for managing data in a system for managing safety devices in a building during the detection of a threat event in accordance with one or more embodiments of the present disclosure. The method 300 may be performed by the system 100, for example.

The method 300 may include receiving 302 sensor data from the detection systems 102. Some of examples of the sensor data may include time of measurement, date of measurement, type of measurement, measured sensor values, location coordinates of sensors providing the data, state of the detection system/sensor (e.g., the sensor data is valid or invalid).

The method 300 may include aggregating 304 data from the detection systems 102 in the detections database 116. In some embodiments, the sensor data may be aggregated into a plurality of databases. In some embodiments, the databases may be distributed.

The method 300 may include creating 306 database records having risk probability scores. In some embodiments, the database records may include parameters such as: detection data priority, distance from target zone, and detection data quality.

In some embodiments, the data records may be stored in one or more data tables. In some embodiments, a data table may be created for each of the detection system. In some embodiments, a data table may be created for each of the data types.

Figure 7:
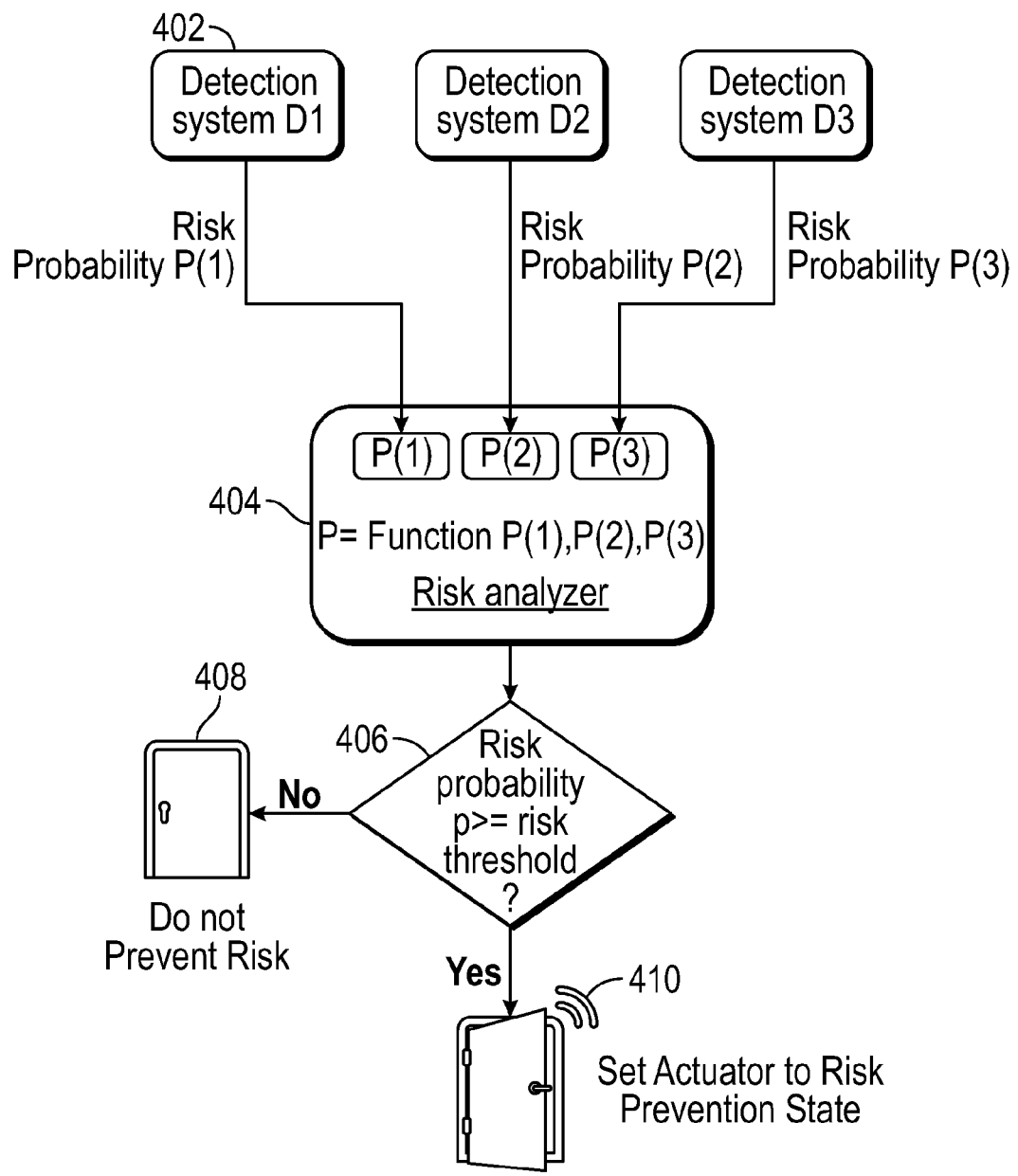
FIG. 7 is a first flow diagram of a system for managing safety devices in a building during the detection of a threat event in accordance with one or more embodiments of the present disclosure.

FIG. 7 is a first flow diagram of the system 100 for managing safety devices in a building during the detection of a threat event in accordance with one or more embodiments of the present disclosure. In some embodiments, risk probability P(1) to P(n) may be determined in accordance with sensor data measured by the detection systems 402 denoted $D_1$, $D_2$, and $D_3$ as shown in FIG. 7.

In some embodiments, a risk analyzer 404 may receive values of risk probability, e.g. P(1), P(2), P(3). The risk analyzer 404 may include functions that take these risk probability values as an input, and output a merged value of a total risk probability P. Total risk probability P may be compared in a decision step 406 to a probability risk probability threshold value which may be used to assess if at least risk one risk mitigation action may be needed to reduce the risk of damage to the building.

In some embodiments, the risk probability threshold value may be set in accordance to the target actuator-controlled safety device 110. The risk probability threshold value may be set in accordance with the target type of construction of the building. The risk probability threshold value may be set in accordance to the historical data at the target device/location. The risk probability threshold value may be dynamic and modifiable in accordance to updated sensor data or additional data collected by other suitable systems. The risk probability threshold value may be determined by a machine learning model (e.g., an artificial intelligence-based algorithm).

In some embodiments, when the risk analyzer 404 determines that a risk mitigation action is not required, the risk management instruction to system 100 may set the operational state of the actuator-controlled safety device 110 to "do not prevent risk" state 408, or stated differently, the system 100 may maintain the current operational state of the actuator-controlled safety device 110. Otherwise, when the risk analyzer 404 determines that a risk mitigation action is required 410, the system 100 may reduce the damage risk to the building before the actual occurrence of the threat event by setting the device actuator 108 to cause a change in the operational state of the actuator-controlled safety device 110 to a risk prevention state 410 so as to reduce damage of the building during the actual occurrence of the threat event.

Figure 8:
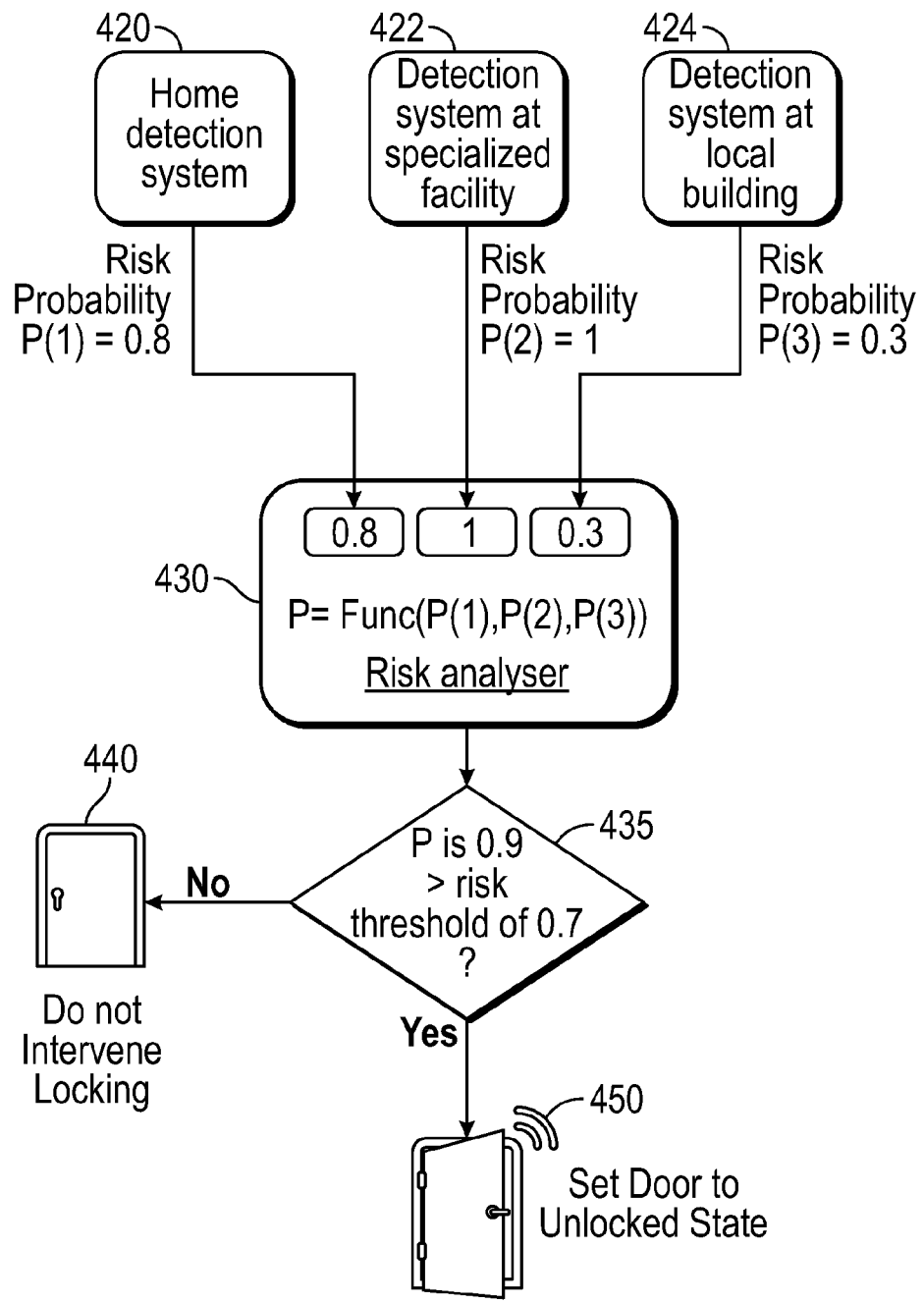
FIG. 8 is a second flow diagram of a system for managing safety devices in a building during the detection of a threat event in accordance with one or more embodiments of the present disclosure.

FIG. 8 is a second flow diagram of the system 100 for managing safety devices in a building during the detection of a threat event in accordance with one or more embodiments of the present disclosure. In this exemplary embodiment, the detection system 402 of system 100 may include a home detection system 420, a detection system of a specialized facility 422, and detection system at a local building 424. The value of the probability of risk may be provided by an output of the detection system 402 that may be a probability value between 0 to 1, for example, P(1)=0.8, P(2)=1, and P(3)=0.3. The risk analyzer 430 may compute the total risk probability P to be 0.9 for this exemplary embodiment.

The value of P may not necessarily be the mean of value of P(n). The data from each of detection systems as shown in FIG. 8 may be normalized and assigned different weights in the computation of the total risk probability P by the risk analyzer 430. In a decision step 435, the risk threshold may be set to 0.7. When the system 100 determines that the risk of a catastrophic event is high 410 in the decision step 435, the actuator-controlled safety device 110 which is the door-related safety device 8 may cause a change in the operational state of the door in the building to be unlocked and pushed opened, thus allowing persons to escape through the door. Otherwise, when the system 100 determines that the risk of a catastrophic event is low 408 in the decision step 406, the door may remain in the current operational state that is not changed.

Figure 9A:
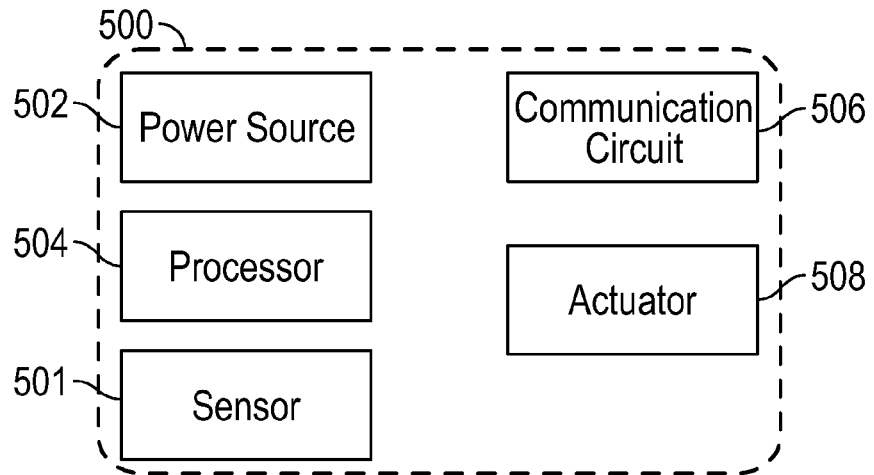
FIG. 9A is a first embodiment of a detection system in a building for the detection of a threat event in accordance with one or more embodiments of the present disclosure.

FIG. 9A is a first embodiment of a detection system 500 in a building for the detection of a threat event in accordance with one or more embodiments of the present disclosure. The detection system 500 may include actuators 508 respectively controlling actuator-controlled safety devices, sensors 501 (e.g., environmental condition detection sensors), a processor 504, a communication circuit 506, and a power source 502, such as an electrical power source, a battery, generator, and a regional electrical network. In some embodiments, the power source may utilize a motion-based generation of power by water or wind, for example.

In some embodiments, the plurality of actuator-controlled safety devices controlled by actuators 508 may include a door related safety module for controlling the door lock release mechanism and the door push opener mechanism. In some embodiments, the plurality of actuator-controlled safety devices may include a fluid control module. In some embodiments, the plurality of actuator-controlled safety devices may include an electricity control module.

Figure 9B:
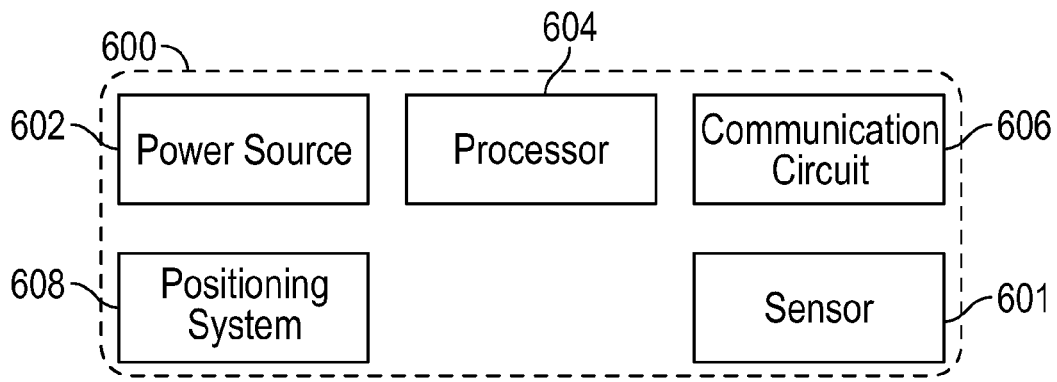
FIG. 9B is a second embodiment of a detection system in a building for the detection of a threat event in accordance with one or more embodiments of the present disclosure.

FIG. 9B is a second embodiment of a detection system 600 in a building for the detection of a threat event in accordance with one or more embodiments of the present disclosure. The detection system 600 may be similar to the detection system 500 of FIG. 9A. However, the detection system 600 may include a positioning system 608. The positioning system 608 may determine and output location coordinates of the detection system 600. The coordinates may include, for example, data about height and surface coordinates of the detection system 600. In some embodiments, the positioning system 608 may be an indoor positioning system. In some embodiments, the positioning system 608 may be an outdoor positioning system.

In some embodiments, the detection system 600 may not include an actuator to control an actuator-controlled safety device. The detection system 600 may include detection systems located on a building, or at a specific location remote of a safety device, which may be used to transmit an alert when risk is predicted from an imminent occurrence of the threat event.

Figure 9C:
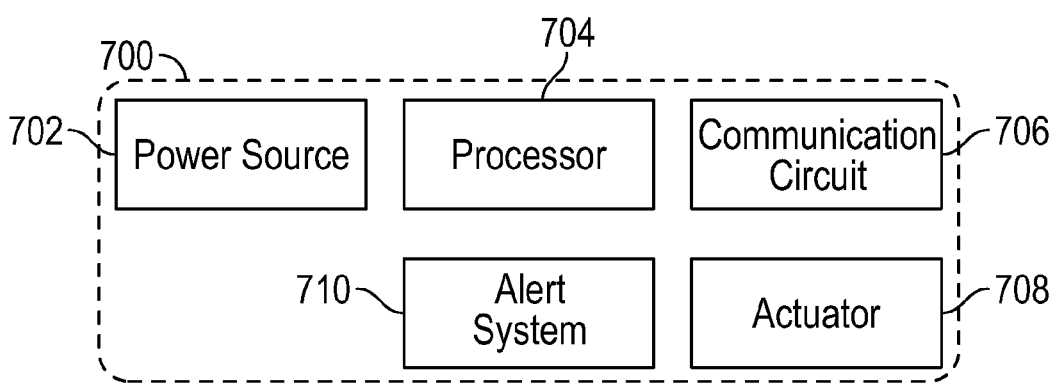
FIG. 9C is a first embodiment of a response system to detecting a threat event in accordance with one or more embodiments of the present disclosure.

FIG. 9C is a first embodiment of a response system 700 in response to a detected threat event in accordance with one or more embodiments of the present disclosure. The response system 700 may include a power source 702 for powering the various elements of the response system 700. In some embodiments, the power source 702 may include a backup power unit. Additionally. the response system 700 may include a processor 704, and a communication circuit 706. In some embodiments, the response system 700 may include actuators 708 for controlling actuator-controlled safety devices as described elsewhere herein. In other embodiments, the response system 700 may include an alert system 710.

Figure 10:
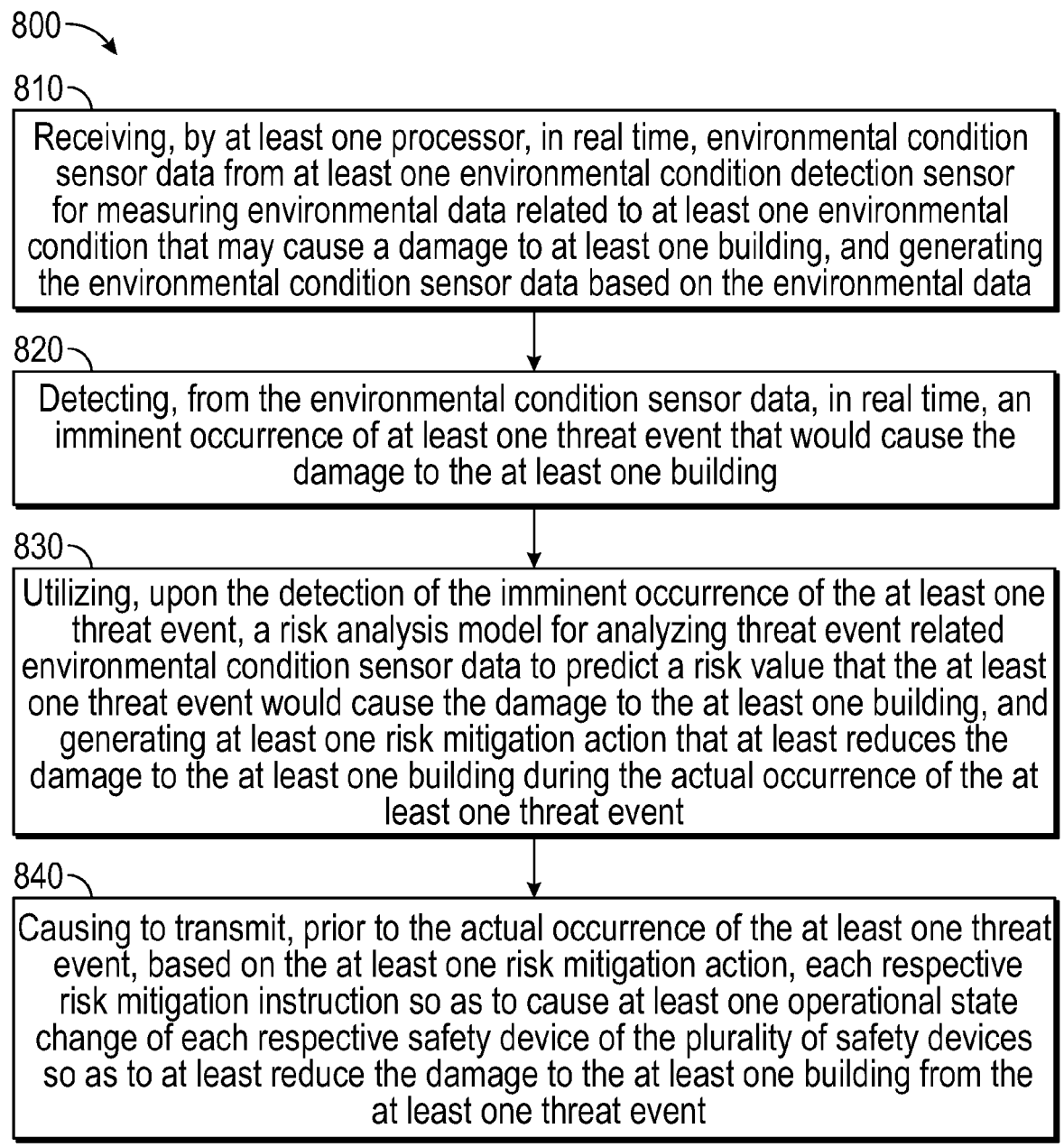
FIG. 10 is a second flowchart of a method for managing safety devices in a building during the detection of a threat event in accordance with one or more embodiments of the present disclosure.

FIG. 10 is a second flowchart of a method 800 for managing safety devices in a building during the detection of a threat event in accordance with one or more embodiments of the present disclosure. Method 800 may be performed by any of processors 29A and 29B of FIG. 1, and/or the processors shown in FIGS. 9A-9C.

Method 800 may include receiving 810, by at least one processor, in real time, environmental condition sensor data from at least one environmental condition detection sensor for measuring environmental data related to at least one environmental condition that may cause a damage to at least one building and generating the environmental condition sensor data based on the environmental data.

Method 800 may include detecting 820, from the environmental condition sensor data, in real time, an imminent occurrence of at least one threat event that would cause the damage to the at least one building.

Method 800 may include utilizing 830, upon the detection of the imminent occurrence of the at least one threat event, a risk analysis model for analyzing threat event related environmental condition sensor data to predict a risk value that the at least one threat event would cause the damage to the at least one building, and generating at least one risk mitigation action that at least reduces the damage to the at least one building during the actual occurrence of the at least one threat event.

Method 800 may include causing 840 to transmit, prior to the actual occurrence of the at least one threat event, based on the at least one risk mitigation action, each respective risk mitigation instruction so as to cause at least one operational state change of each respective safety device of the plurality of safety devices so as to at least reduce the damage to the at least one building from the at least one threat event.

In some embodiments, when a disaster or threat event is detected by the local control system such as the local threat management control (LTMC) system 6, after receiving an indication from a system of seismic sensors or other warning systems such as a fire detection system and/or a red color system warning of missile fire, LTMC system 6 may implement a set of immediate risk mitigation actions that depend on the severity of the detected imminent threat event. In some embodiments, an alert may be displayed the local facility control center (FCC) 7, or at the building's local control center (HMI). An alert may be sent to a national control center (e.g., the National Seismological Center 2, or the Company Control Center 3). An alert may be sent to various cell phones. An alert may be issued with an update identifying the number of persons staying in the building to the rescue and rescue authorities (e.g., the National Search and Rescue Unit 4) for allowing the rescue forces to rescue the occupants in the building.

In some embodiments, such as in public buildings, the local facility control center (FCC) 7 may display on a dedicated display screen, the condition of the building before and/or after the actual occurrence of the threat event.

In some embodiments, during the actual occurrence of the threat event, damage to the electricity, water and gas infrastructure may occur. Power cables may be torn and exposed. Water and gas pipes may be cracked and torn. These conditions may pose an immediate danger to life for people in the building due to electric shock, fire or gas explosion, for example. Thus, the system 1 may be configured to automatically disconnect the main electricity, disconnect the gas system and/or disconnect the water system in the building. Thus, if evacuation of the building is needed, the evacuation may be performed without the need to perform any human actions that consume valuable time.

When a disaster occurs, an instinct of most people may be to get to the door in order to evacuate the building. However, during an earthquake or a missile hit damaging the building, for example, the doorframes may "warp", and the door latch and locking bolts and rods may become stuck inside the door jamb in a way that that the door cannot be opened. Thus, the door of the public building or the private house may turn the building into a trap that may prevent persons evacuating the building quickly and may prevent the rescue forces from entering the building to rescue trapped people quickly.

In some embodiments, when the system 1 detects an imminent occurrence of the threat event, the system 1 may immediately and autonomously open doors the building in order to allow a quick evacuation of persons in the building. System 1 may use the door related safety device 8 which provides three risk mitigation actions to open the door before the actual occurrence of the threat event. First, the door latch opener 21 and the door bolt opener 22 may work in tandem to open the door bolts (e.g., locks) and the tab (e.g., the door latch or handle). The door latch opener 21 and the door bolt opener 22 may operate in 2 different actions, where a first action opens the door bolts and a second action pulls the tab back such that the door is unaffixed, or not affixed to the door frame. Secondly, the door opener device 20 may use a push rod mechanism to push the door out from the door frame once the latches and lock bolts are released (e.g., the door is unaffixed to the doorframe).

Figure 11A:
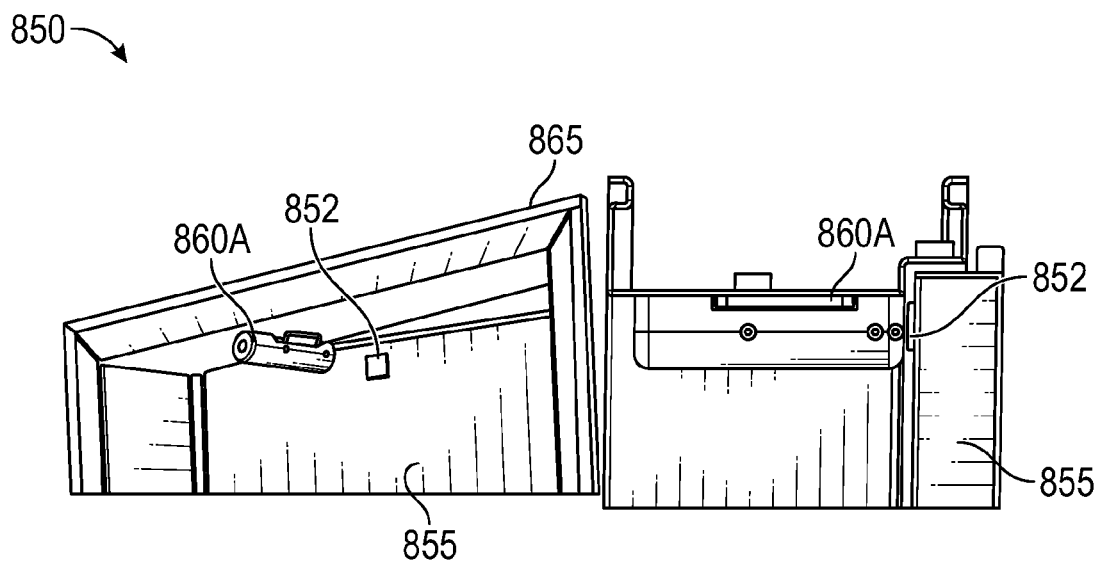
FIGS. 11A and 11B are views of a first embodiment of an electric door opener device with a push rod in a standby mode and a push mode in accordance with one or more embodiments of the present disclosure.
Figure 11B:
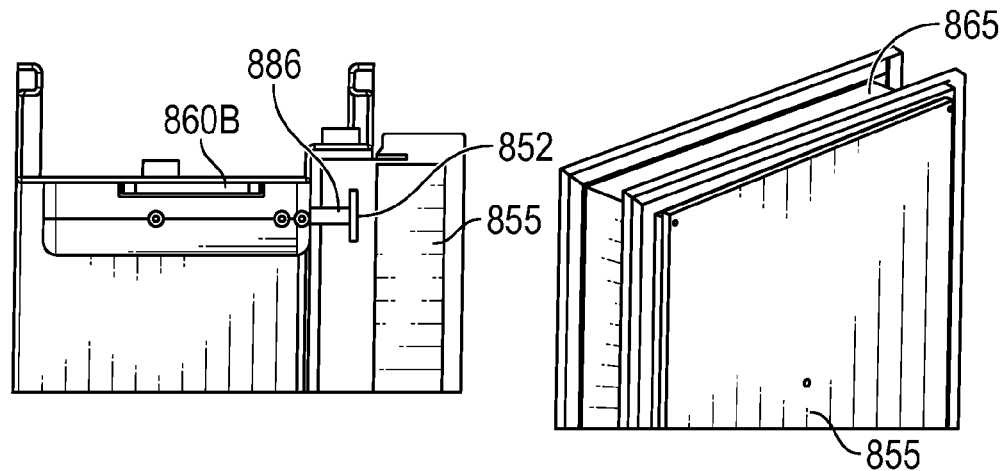

FIGS. 11A and 11B are views 850 of an electric door opener device 860 with a push rod in a standby mode and a push mode in accordance with one or more embodiments of the present disclosure. The electric door opener device 860 may be the electric door opener device 20 controlled by the actuator 14 as shown in FIG. 1. Note that the number label 860A refers to the electric door opener device 860A in a standby mode and 860B refers to the electric door opener device 860B in a push mode, or release mode.

FIG. 11A illustrates the electric door opener device 860A in a standby mode. A door 855 in a door frame 865 may include a steel bumper 852 for contact by a push rod 866, now compressed within the electric door opener device 860A. The right view shows a cross-sectional view of the door 855 when closed. The distance of the electric door opener device 860A mounted on the upper portion of the doorframe 865 to the left portion of the doorframe 865 may be about 200 mm.

FIG. 11B illustrates the electric door opener device 860B in a push mode to open the doors when the latch and the lock bolts are all released. When triggered by the actuator 14, the push rod 866, which is spring loaded, pushes the door 855 open from the door frame 865 as shown in the right cross-sectional view.

Figure 12:
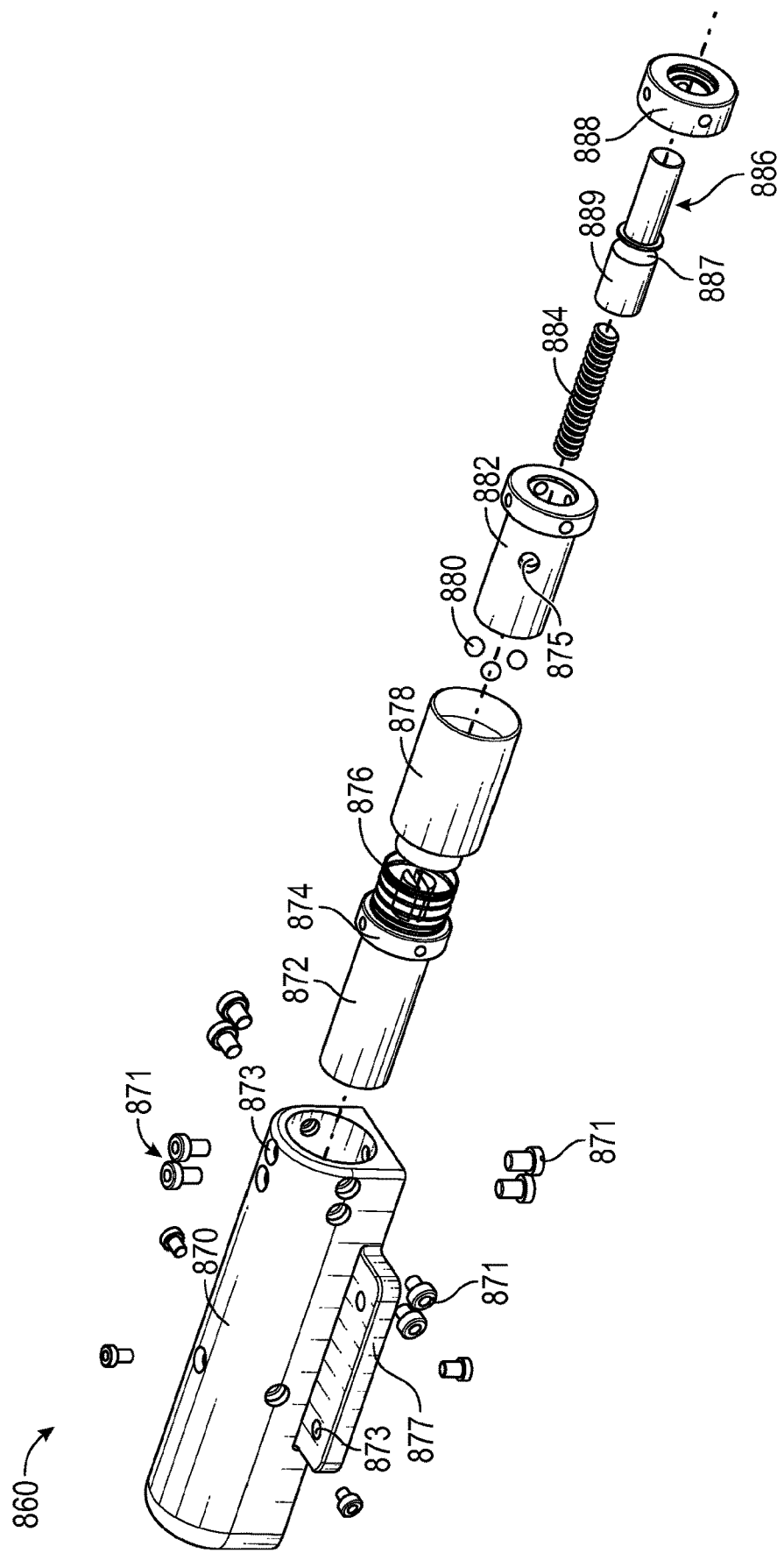
FIG. 12 is an exploded view of an electric door opener device with a push rod in accordance with one or more embodiments of the present disclosure.

FIG. 12 is an exploded view of the electric door opener device 860 with a push rod 866 in accordance with one or more embodiments of the present disclosure. To further illustrate the operation of the electric door opener device 860, the electric door opener device 860 may include a housing 870, a solenoid 872 with a collar 874, a first spring 876, a sheath 878, a sleeve 882 with a hole 875 to hold ball bearings 880 between the sheath 878 and the sleeve 882 when assembled, a push rod spring 884 to be inserted into the sleeve 882, a push rod 886 with a portion 889 of the push rod 886 with a first diameter and a groove 887 in the push rod 886 with a second diameter smaller than the first diameter to hold the ball bearings 880 through the hole 875, and a collar 888. The push rod 886 and the push rod spring 884 may be configured to be inserted into the sleeve 882. Screws 871 may be used to hold the electric door opener device assembly together. A mounting bracket 877 coupled to the housing 870 with holes 873 may be used to mount the housing 870 in any suitable location using the mounting bracket 877. For example, the housing 870 may be mounted to an upper portion of the door frame 865 as shown in FIG. 11A

FIGS. 13A and 13B are an isotropic view and a cross-sectional view of the electric door opener device 860A with the push rod 886 in a standby mode in accordance with one or more embodiments of the present disclosure. In the operation of the electric door opener device 860, when the door is closed, the extended push rod 886 contacts the steel bumper 852 causing a force on the push rod 886 that forces the push rod 886 into the housing 870 while compressing both the first spring 876 and the push rod spring 884 as shown in FIG. 13A.

FIG. 13B illustrates a cross-sectional view of the electric door opener device 860A in a standby mode. The sheath 878 may include an inner region 878A with a smaller diameter and an inner region 878B with a larger diameter. When closing the door and forcing the push rod 886 into the assembly, ball bearings 880 are forced into the hole 875 and held in the groove 887 of the push rod 886. The inner region 878A with the smaller diameter further holds the ball bearing 880 in the hole 875 of the sleeve 882 and also in the groove 887 of the push rod 886. The push rod 886 is held in place by the ball bearing 880 in the groove 887 while the push rod spring 884 is compressed and cocked within a push rod cavity 890 of the push rod 886 and a sleeve cavity 892 within the sleeve 882, as will be seen in FIG. 14B. The first spring 876, that may be coupled to the solenoid 872 at one end and to the sheath 878 at the other end, is also compressed. In this operational state, the sheath 878 may hold the ball bearing 880 in the groove 887 of the push rod 886.

FIGS. 14A and 14B are an isotropic view and a cross-sectional view of an electric door opener device 860B with the push rod 886 in a push mode in accordance with one or more embodiments of the present disclosure. FIG. 14A shows the push rod 886 extended from the housing 870 of the electric door opener device 860B.

FIG. 14B illustrates a cross-sectional view of the electric door opener device 860B in the push mode. When an imminent occurrence of the threat event is detected and the controller 28A and/or 28B generate a risk mitigation action that includes opening closed doors within the building, the doors are first unlocked. An instruction may then be sent to an actuator (e.g., the actuator 14) controlling the solenoid 872 to open the door. The actuator may cause the solenoid 872 to pull the sheath 878 inward opposite the force of the first spring 876 so as to move the sheath 878 with the first diameter 878A that holds the ball bearing 880 in the groove 887 through the hole 875 to a region of the sheath 878 with the second larger diameter 878B. This action allows the ball bearing 880 to pop out of the groove 887 in the push rod 886 releasing the compressed push rod spring 884 to propel the push rod 886 out of the housing 870 for opening the unlocked and unlatched door prior to the actual occurrence of the threat event. Note that the sleeve 882 may include the sleeve cavity 892 and the push rod 886 may include the push rod cavity 890. These two cavities may hold the push rod spring 884 in either operational state.

FIG. 15A is a view of a door 900 stuck in a deformed doorframe 920 in accordance with one or more embodiments of the present disclosure. The deformation in the deformed doorframe 920 may have resulted from earthquake damage, for example. The door 900 may include a door handle 905 which when rotated, may release the hold latch from the door frame. However, an inner locking rod 910 for locking the door 900 in the doorframe 920 in a normal operational state may now have a portion 945 stuck in the deformed doorframe 920 which prevents the door 900 from opening and possibly traps people within the building.

FIG. 15B is a door 950 with a door opening safety system for opening a door in a door frame upon detection of a threat event in accordance with one or more embodiments of the present disclosure. The door 950 may include a push spring releaser 951, a camera 952, an electricity supply 954, a battery 956, a control unit 958 coupled to an alert receiver 956 to receive risk mitigation instructions for opening the door, a lock motor 960 held in a region 955 within the door for opening lock rods 910 in the door, an alarm 962 and an emergency light 964. Ends of the locking rods 910 within the door may be configured to extend outward from the door where the ends may be inserted into holes, for example, in the door frame for locking the door.

In some embodiments, the push spring releaser 951 may be a compressed spring (not shown) placed at any suitable location between the door and the door frame where the compressed spring opens the door when the lock motor 960 retracts the locking rods to unlock and/or unlatch the door. In other embodiments, the push spring releaser 951 may be the electric door opener device 860 shown in the previous figures.

In some embodiments, when the actuator 14 of door related safety device 8 sends a risk mitigation instruction to the control unit 958 to open the door upon detecting the imminent occurrence of the threat event, the control unit 958 causes the lock motor 960 to automatically open the door allowing the push spring releaser 951 or the electric door opener device 860 to push the door open from the door frame.

In some embodiments, system 1 may provide a mobile reporting system in case of the door opening to a home owner to alert the home owner that the doors of the house or apartment were automatically opened.

In some embodiments, the door related safety devices 8 may be disabled manually or automatically using location tracking if there are no inhabitants in the house or apartment during the detection of the imminent occurrence of the threat event using a mobile computing device application, for example.

In some embodiments, the door related safety devices 8 may be activated to open the door using a mobile computing device application if the keys of the house or apartment are lost, for example.

Figure 16B:
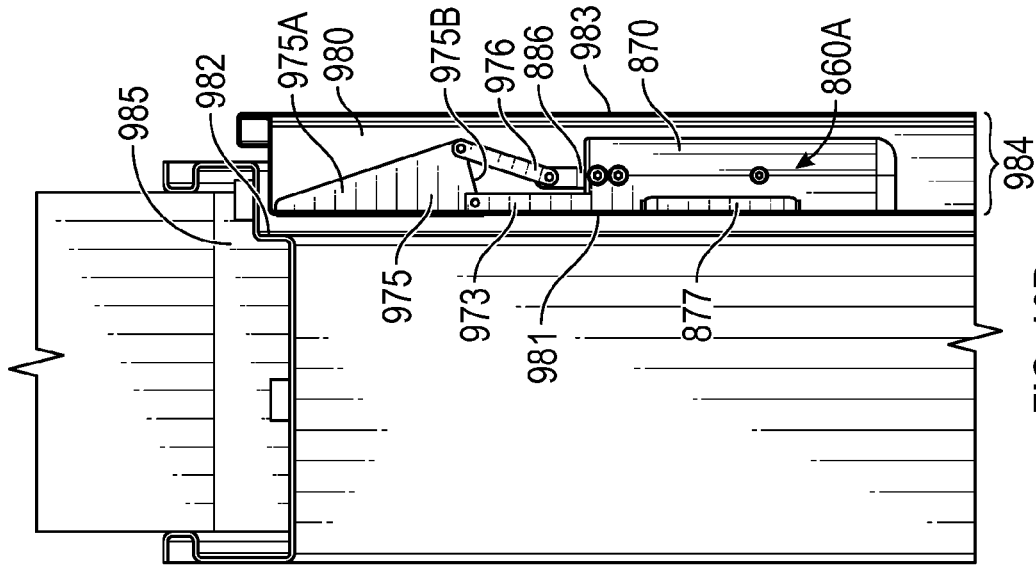
FIGS. 16A and 16B are views of a second embodiment of an electric door opener device with a push lever in a standby mode in accordance with one or more embodiments of the present disclosure.
Figure 16A:
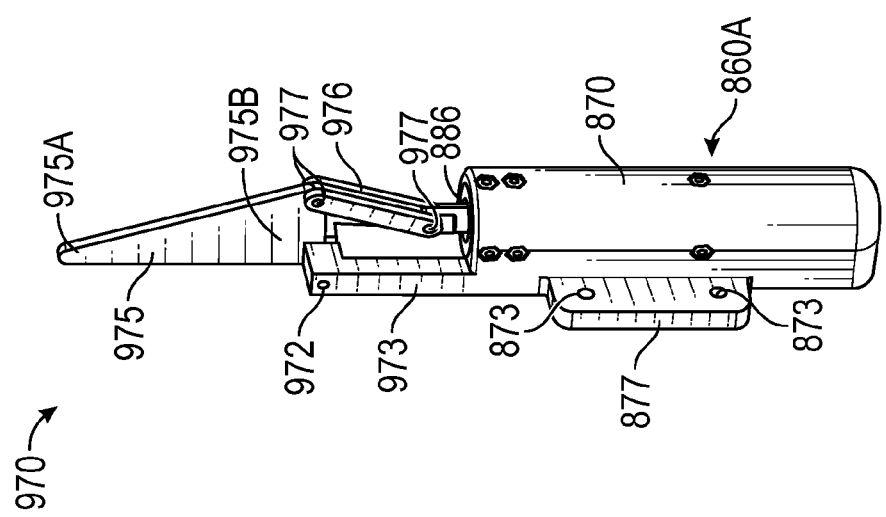

FIGS. 16A and 16B are views of a second embodiment of an electric door opener device 970 with a push lever 975 in a standby mode in accordance with one or more embodiments of the present disclosure.

FIG. 16A shows the electric door opener device 970 in a standby mode that may include the push lever 975 with a first end 975A and a second end 975B and the electric door opener device 860A in a standby mode, for example, as shown in FIG. 13A with the push rod 889 within the housing 870. The push rod 886 is coupled to the second end 975B of the push lever 975 through a first connecting member 976 with first mounting fasteners 977 (e.g., screws, rivets, or any suitable connector) for fastening the first connecting member 976 to the push rod 886 and the push lever 975. A second connecting member 973 may be coupled to the second end 975B through a second mounting fastener 972 that acts as a rotational pivot point for the push lever 975 when rotating in the push mode.

FIG. 16B shows the electric door opener device 970 in a standby mode mounted within a door 980. In some embodiments, the door 980 may have a first surface 981 and a second surface 982 between which there may be a cavity 983 within the door 980 into which the housing 870 may be mounted onto the first surface 981, for example, through the mounting bracket 877. The door 980 may be configured to operate in a door frame 985 which may include a doorframe lip 982 onto which the first end 975A of the push lever 975 may push so as to open the door when the solenoid 872 within the housing 870 is activated as previously described herein.

Figure 17B:
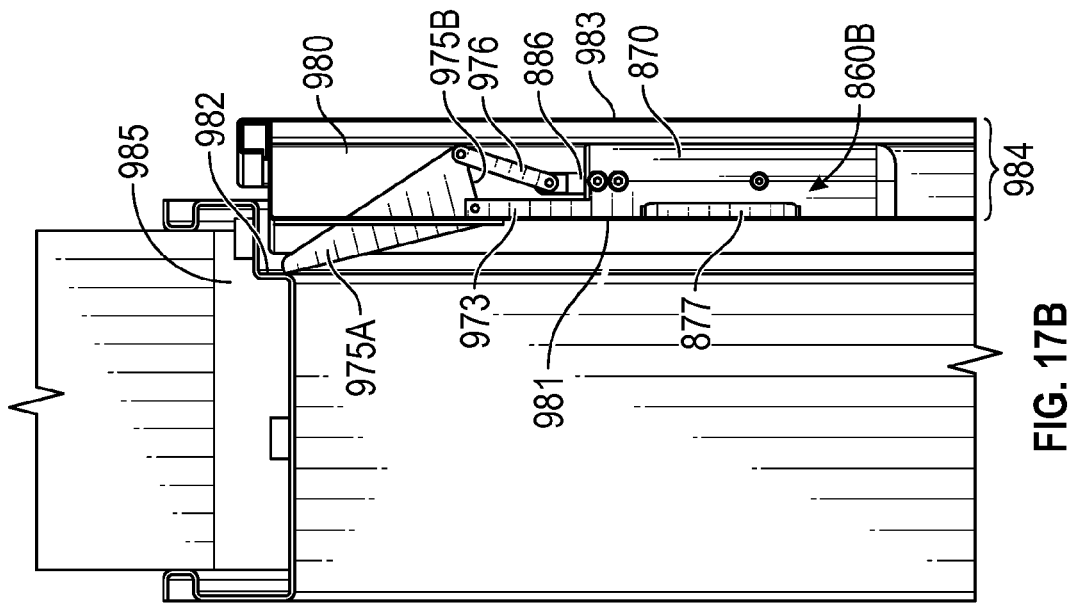
FIGS. 17A and 17B are views of a second embodiment of an electric door opener device with a push lever in a push mode in accordance with one or more embodiments of the present disclosure.
Figure 17A:
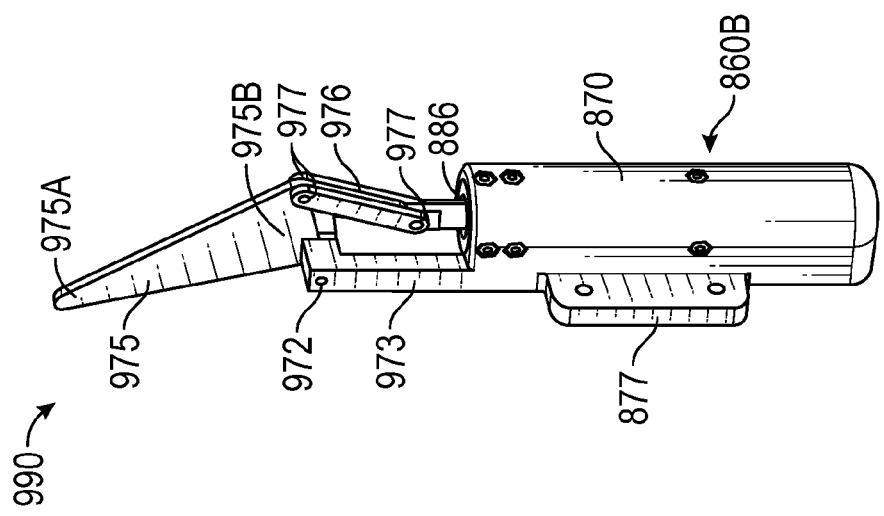

FIGS. 17A and 17B are views of the second embodiment of an electric door opener device 990 in a push mode in accordance with one or more embodiments of the present disclosure.

FIG. 17A shows the electric door opener device 990 with the push lever 975 in a push mode. The push rod 886 may include, for example, the electric door opener device 860B in a push mode (as shown in FIG. 14A) with the push rod 889 extended out of the housing 870. Upon activating the push mode when applying an electrical signal to the solenoid 872, the push rod 889 may push on the push lever 975 through the first connecting member 976 which causes the first end 975A of the push lever 975 to rotate about the second mounting fastener 972 acting as a rotational pivot point (e.g., counterclockwise to the left side in the exemplary orientation shown in FIG. 17A).

FIG. 17B shows the electric door opener device 970 with the push lever 975 in a push mode mounted within a door 980. FIG. 17B shows the first end 975A pushing on the doorframe lip 982 so as to push the door 980 open from the doorframe 985 so long as the door is unaffixed to any portion of the doorframe (e.g., the door is not latched, not locked by lock bolts, or both). The electric door opener device 860 may be reset to the standby mode when a person pushes the door closed thereby forcing the first end 975A back to an upright position as the doorframe lip 982 pushes back on the first end 975A. Within the cavity 984, this pushes the push rod 886 back into the housing 870 where the ball bearing 880 pops back into the groove 887 along the body of the push rod 886 as the push rod spring 884 is compressed. In some embodiments, the cavity 984 may be formed only within a portion of the door 980.

Figure 18:
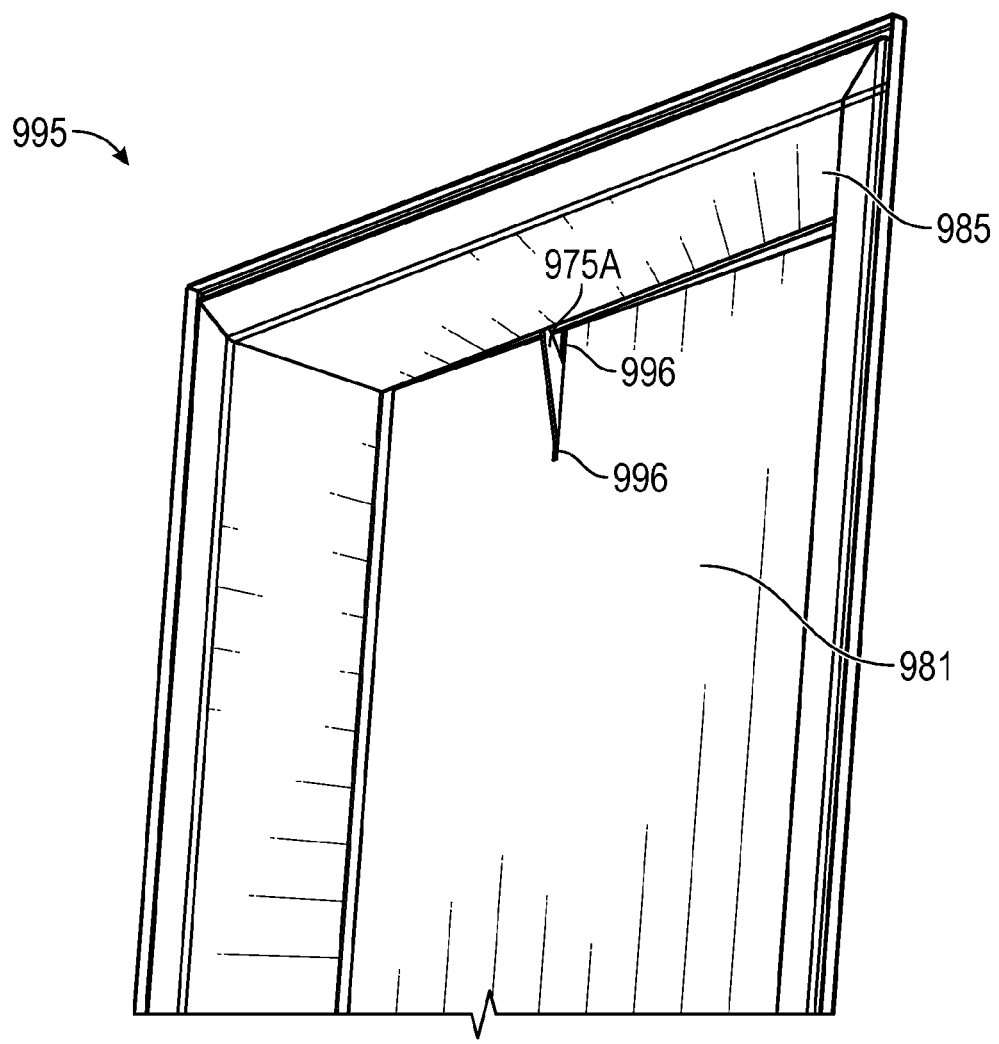
FIG. 18 is an isotropic view of a push lever of an electric door opener device pushing open a door from a doorframe in accordance with one or more embodiments of the present disclosure.

FIG. 18 is an isotropic view 995 of the first end 975A of the push lever 975 of the electric door opener device 990 pushing open the door 980 from the doorframe 985 in accordance with one or more embodiments of the present disclosure. FIG. 18 shows the first surface 981 of the door 980. In the push mode, the first end 975A of the push lever 975 pushes the doorframe lip 982 of the doorframe 985 through an opening 996 in the first surface 981 of the door 980. The opening 996 is shown as a slot in this case, but may be any suitably shaped opening 996 such that the first end 975A of the push lever 975 may be fired outward into the doorframe lip 982 so as to push open the door 980 from the doorframe 985.

At least some aspects of the present disclosure will now be described with reference to the following numbered clauses.

1. A system may include:
   at least one processor;
   at least one memory;
   a plurality of actuators to control a plurality of safety devices deployed in at least one building;
      where the plurality of safety devices may include at least one door-related safety device;
   at least one environmental condition detection sensor may be configured to at least:
      i) measure environmental data related to at least one environmental condition that may cause a damage to the at least one building, and
      ii) generate environmental condition sensor data based on the environmental data;
   where the at least one processor may be configured to execute computer code stored in the at least one memory that causes the at least one processor to:
   receive, in real time, the environmental condition sensor data from the at least one environmental condition detection sensor;
   detect, from the environmental condition sensor data, in real time, an imminent occurrence of at least one threat event that would cause the damage to the at least one building;
      where a detection of the imminent occurrence of the at least one threat event is prior to an actual occurrence of the at least one threat event;
   utilize, upon the detection of the imminent occurrence of the at least one threat event, a risk analysis model to:
      i) analyze threat event related environmental condition sensor data to predict a risk value that the at least one threat event would cause the damage to the at least one building, and
      ii) generate at least one risk mitigation action that at least reduces the damage to the at least one building during the actual occurrence of the at least one threat event;
   cause to transmit, prior to the actual occurrence of the at least one threat event, based on the at least one risk mitigation action, each respective risk mitigation instruction to each respective actuator of the plurality of actuators so as to cause at least one operational state change of each respective safety device of the plurality of safety devices so as to at least reduce the damage to the at least one building from the at least one threat event.

2. The system according to clause 1, where the at least one threat event may be related to at least one of:
   (i) an earthquake,
   (ii) a flood, and
   (iii) a fire.

3. The system according to clause 1, may further include at least one interface circuitry for converting digital signals from the at least one processor to control signals for controlling each of the plurality of actuators.

4. The system according to clause 1, where the at least one threat event may be an earthquake; and where the at least one environmental condition detection sensor may include at least one seismic detector.

5. The system according to clause 4, where the at least one processor may be configured to detect the imminent occurrence of the earthquake by measuring a seismic P-wave in seismic data from the at least one seismic detector.

6. The system according to clause 4, where the at least one seismic detector may be a plurality of seismic detectors that may include at least one first seismic detector at a first geographic location and at least one second seismic detector at a second geographic location, different from the first geographical location, and where the at least one processor may be configured to detect the imminent occurrence of the earthquake by comparing seismic data received from the at least one first seismic detector to seismic data received from the at least one second seismic detector.

7. The system according to clause 6, where the at least one processor may be configured to verify the imminent occurrence of the earthquake as reliable by applying a coincidence criterion to the seismic data received from the at least one first seismic detector to the seismic data received from the at least one second seismic detector.

8. The system according to clause 1, where the at least one processor may be configured to detect, from the environmental condition sensor data, in real time, the imminent occurrence of at least one threat event based on a detection of measured values in the environmental condition sensor data that cross predefined threshold values.

9. The system according to clause 1, where the plurality of safety devices may include the at least one door-related safety device and at least one of:
(i) a gas valve,
(ii) a water valve,
(iii) an elevator controller,
(iv) a siren controller, and
(v) an electrical panel controller.

10. The system according to clause 1, where the at least one processor may be a plurality of processors that may include at least one first processor located on a first side of the at least one building and at least one second processor located on a second side of the at least one building.

11. The system according to clause 10, where the at least one first processor may be configured to communicate with the at least one second processor over an optical fiber deployed from the first side to the second side of the at least one building and to verify over the optical fiber, the detection of the imminent occurrence with the at least one second processor.

12. The system according to clause 1, where the at least one environmental condition detection sensor may be a plurality of environmental condition detection sensors that may include at least one first environmental condition detection sensor positioned on a first side of the at least one building and at least one second environmental condition detection sensor positioned on a second side of the at least one building.

13. The system according to clause 12, wherein the at least one processor may be further configured to determine that the detection of the imminent occurrence is unreliable due to a mismatch between the environmental condition sensor data from the at least one first environmental condition detection sensor at the first side and the environmental condition sensor data from the at least one second environmental condition detection sensor at the second side of the at least one building.

14. The system according to clause 1, where the at least one door-related safety device may include an electric door opener device with a push rod; and where the push rod may be configured to apply a force on a door so as to open the door before the actual occurrence of the at least one threat event.

15. The system according to clause 1, where the at least one door-related safety device may include an electric latch and bolt release device; and where the electric latch and bolt release device may be configured to release a latch, a bolt, or both in a door before the actual occurrence of the at least one threat event.

16. The system according to clause 1, where the at least one risk mitigation action may be based in part on at least one of:
(i) a structure type of the at least one building,
(ii) at least one construction material of the at least one building,
(iii) positions of each of the plurality of safety devices within the at least one building,
(iv) properties of a substrate under the at least one building, and
(v) an estimated seismic event magnitude impacting the at least one building.

17. The system according to clause 1, where the at least one building may be a skyscraper; and where the at least one processor may be configured to cause to transmit a risk mitigation instruction to an elevator controller that causes an elevator operating in the skyscraper to stop at a nearest floor and to open doors of the elevator before the actual occurrence of the at least one threat event.

18. The system according to clause 1, may further include a cellular modem, and where the at least one processor may be configured to communicate through the cellular modem, a warning to threat management systems located in other buildings within a geographical area around the at least one building before the actual occurrence of the at least one threat event.

19. The system according to clause 1, may further include a cellular modem, and where the at least one processor may be configured to communicate through the cellular modem, a warning before the actual occurrence of the at least one threat event to a national seismic center, a government civil defense unit, a national search and rescue unit, a company control center, or any combination thereof.

20. A method may include:
receiving, by at least one processor, in real time, environmental condition sensor data from at least one environmental condition detection sensor for:
i) measuring environmental data related to at least one environmental condition that may cause a damage to at least one building, and
ii) generating the environmental condition sensor data based on the environmental data;
detecting, by the at least one processor, from the environmental condition sensor data, in real time, an imminent occurrence of at least one threat event that would cause the damage to the at least one building;
where a detection of the imminent occurrence of the at least one threat event is prior to an actual occurrence of the at least one threat event;
utilizing, by the at least one processor, upon the detection of the imminent occurrence of the at least one threat event, a risk analysis model for:

i) analyzing threat event related environmental condition sensor data to predict a risk value that the at least one threat event would cause the damage to the at least one building, and
ii) generating at least one risk mitigation action that at least reduces the damage to the at least one building during the actual occurrence of the at least one threat event;
where a plurality of safety devices may include at least one door-related safety device; and
causing, by the at least one processor, to transmit, prior to the actual occurrence of the at least one threat event, based on the at least one risk mitigation action, each respective risk mitigation instruction so as to cause at least one operational state change of each respective safety device of the plurality of safety devices so as to at least reduce the damage to the at least one building from the at least one threat event.

21. The method according to clause 20, where the at least one threat event may be an earthquake; and wherein the at least one environmental condition detection sensor may include at least one seismic detector.

22. The method according to clause 21, where the detecting the imminent occurrence of the earthquake may include measuring a seismic P-wave in seismic data from the at least one seismic detector.

23. The method according to clause 21, where the at least one seismic detector may be a plurality of seismic detectors that may include at least one first seismic detector at a first geographic location and at least one second seismic detector at a second geographic location, different from the first geographical location, and where the detecting the imminent occurrence of the earthquake may include comparing seismic data received from the at least one first seismic detector to seismic data received from the at least one second seismic detector.

24. The method according to clause 23, may further include verifying, by the at least one processor, the imminent occurrence of the earthquake as reliable by applying a coincidence criterion to the seismic data received from the at least one first seismic detector to the seismic data received from the at least one second seismic detector.

25. The method according to clause 20, where the detecting the imminent occurrence of at least one threat event may include detecting measured values in the environmental condition sensor data that cross predefined threshold values.

26. The method according to clause 20, where the at least one processor may be a plurality of processors that may include at least one first processor located on a first side of the at least one building and at least one second processor located on a second side of the at least one building.

27. The method according to clause 26, where the at least one first processor may be configured to communicate with the at least one second processor over an optical fiber deployed from the first side to the second side of the at least one building, and may further include, verifying, by the at least one first processor, over the optical fiber, the detection of the imminent occurrence with the at least one second processor.

28. The method according to clause 20, where the at least one environmental condition detection sensor may be a plurality of environmental condition detection sensors that may include at least one first environmental condition detection sensor positioned on a first side of the at least one building and at least one second environmental condition detection sensor positioned on a second side of the at least one building.

29. The method according to clause 28, may further include determining, by the at least one processor, that the detection of the imminent occurrence is unreliable due to a mismatch between the environmental condition sensor data from the at least one first environmental condition detection sensor at the first side and the environmental condition sensor data from the at least one second environmental condition detection sensor at the second side of the at least one building.

30. The method according to clause 20, where the at least one building may be a skyscraper; and where the causing to transmit may include causing to transmit a risk mitigation instruction to an elevator controller that causes an elevator operating in the skyscraper to stop at a nearest floor and to open doors of the elevator before the actual occurrence of the at least one threat event.

31. The method according to clause 20, may further include, communicating, by the at least one processor, through a cellular modem, a warning to threat management systems located in other buildings within a geographical area around the at least one building before the actual occurrence of the at least one threat event.

32. The method according to clause 20, may further include, communicating, by the at least one processor, through a cellular modem, a warning before the actual occurrence of the at least one threat event to a national seismic center, a government civil defense unit, a national search and rescue unit, a company control center, or any combination thereof.

33. The method according to clause 20, where the at least one risk mitigation action may be based in part on at least one of:
(i) a structure type of the at least one building,
(ii) at least one construction material of the at least one building,
(iii) positions of each of the plurality of safety devices within the at least one building,
(iv) properties of a substrate under the at least one building, and
(v) an estimated seismic event magnitude impacting the at least one building.

34. The method according to clause 20, wherein the at least one threat event may be related to at least one of:
(i) an earthquake,
(ii) a flood, and
(iii) a fire.

35. The method according to clause 20, wherein the plurality of safety devices may include the at least one door-related safety device and at least one of:
(i) a gas valve,
(ii) a water valve,
(iii) an elevator controller,
(iv) a siren controller, and
(v) an electrical panel controller.

36. An apparatus may include:
a housing that may include:
a ball bearing;
a sheath;
a sleeve may include a sleeve cavity and a hole for inserting the ball bearing;
a push rod with a push rod cavity may be configured to be inserted into the sleeve cavity;
where the push rod may include a groove;
a spring may be configured to be held within the sleeve cavity and the push rod cavity,
wherein the sleeve and the push rod may be configured to be inserted into the sheath;

wherein the sheath may be configured to hold the ball bearing in the groove and the hole when the spring is compressed within the sleeve cavity and the push rod cavity; and a solenoid coupled to the sheath that may be configured to move the sheath when an electrical signal is applied to the solenoid so as to release the ball bearing in the hole from the groove of the push rod that causes the compressed spring to push out the push rod from the housing so as to push open a door from a doorframe when the door is unaffixed to the doorframe.

37. The apparatus according to clause 36, where the housing may be mounted on the doorframe, and where the push rod may push on a steel bumper mounted on the door so as to push open the door from the doorframe.

38. The apparatus according to clause 36, may further include a push lever that may include a first end and a second end;

where the housing may be mounted within the door;

where the first end of the push lever may be coupled to the doorframe through an opening in the door and the second end may be coupled to the push rod in the housing within the door; and where the first end of the push lever may be configured to push open the door from the doorframe through the opening in the door when the push rod is pushed out from the housing.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A system, comprising:
   at least one processor;
   at least one memory;
   a plurality of actuators to control a plurality of safety devices deployed in at least one building;
     wherein the plurality of safety devices comprises at least one door-related safety device;
   at least one environmental condition detection sensor configured to at least:
     i) measure environmental data related to at least one environmental condition that may cause a damage to the at least one building, and
     ii) generate environmental condition sensor data based on the environmental data;
   wherein the at least one processor is configured to execute computer code stored in the at least one memory that causes the at least one processor to:
   receive, in real time, the environmental condition sensor data from the at least one environmental condition detection sensor;
   detect, from the environmental condition sensor data, in real time, an imminent occurrence of at least one threat event that would cause the damage to the at least one building;
     wherein a detection of the imminent occurrence of the at least one threat event is prior to an actual occurrence of the at least one threat event;
   utilize, upon the detection of the imminent occurrence of the at least one threat event, a risk analysis model to:
     i) analyze threat event related environmental condition sensor data to predict a risk value that the at least one threat event would cause the damage to the at least one building, and
     ii) generate at least one risk mitigation action that at least reduces the damage to the at least one building during the actual occurrence of the at least one threat event;
   cause to transmit, prior to the actual occurrence of the at least one threat event, based on the at least one risk mitigation action, each respective risk mitigation instruction to each respective actuator of the plurality of actuators so as to cause at least one operational state change of each respective safety device of the plurality of safety devices so as to at least reduce the damage to the at least one building from the at least one threat event;
     wherein the at least one environmental condition detection sensor is a plurality of environmental condition detection sensors comprising at least one first environmental condition detection sensor positioned on a first side of the at least one building and at least one second environmental condition detection sensor positioned on a second side of the at least one building; and
     wherein the at least one processor is further configured to determine that the detection of the imminent occurrence is unreliable due to a mismatch between the environmental condition sensor data from the at least one first environmental condition detection sensor at the first side and the environmental condition sensor data from the at least one second environmental condition detection sensor at the second side of the at least one building.

2. The system according to claim 1, wherein the at least one threat event is an earthquake, and the at least one environmental condition detection sensor comprises at least one seismic detector; and
   wherein the at least one processor is configured to detect the imminent occurrence of the earthquake by measuring a seismic P-wave in seismic data from the at least one seismic detector.

3. The system according to claim 1, wherein the at least one threat event is an earthquake;
   wherein the at least one environmental condition detection sensor comprises at least one seismic detector; and
   wherein the at least one seismic detector is a plurality of seismic detectors comprising at least one first seismic detector at a first geographic location and at least one second seismic detector at a second geographic location, different from the first geographical location, and wherein the at least one processor is configured to detect the imminent occurrence of the earthquake by comparing seismic data received from the at least one first seismic detector to seismic data received from the at least one second seismic detector.

4. The system according to claim 3, wherein the at least one processor is configured to verify the imminent occurrence of the earthquake as reliable by applying a coincidence criterion to the seismic data received from the at least one first seismic detector to the seismic data received from the at least one second seismic detector.

5. The system according to claim 1, wherein the at least one processor is configured to detect, from the environmental condition sensor data, in real time, the imminent occurrence of at least one threat event based on a detection of measured values in the environmental condition sensor data that cross predefined threshold values.

6. The system according to claim 1, wherein the at least one processor is a plurality of processors comprising at least one first processor located on a first side of the at least one building and at least one second processor located on a second side of the at least one building.

7. The system according to claim 1, wherein the at least one door-related safety device comprises an electric door opener device with a push rod; and wherein the push rod is configured to apply a force on a door so as to open the door before the actual occurrence of the at least one threat event.

8. A system, comprising:
at least one processor;
at least one memory;
a plurality of actuators to control a plurality of safety devices deployed in at least one building;
at least one environmental condition detection sensor configured to at least:
  i) measure environmental data related to at least one environmental condition that may cause a damage to the at least one building, and
  ii) generate environmental condition sensor data based on the environmental data;
wherein the at least one processor is configured to execute computer code stored in the at least one memory that causes the at least one processor to:
  receive, in real time, the environmental condition sensor data from the at least one environmental condition detection sensor;
  detect, from the environmental condition sensor data, in real time, an imminent occurrence of at least one threat event that would cause the damage to the at least one building;
    wherein a detection of the imminent occurrence of the at least one threat event is prior to an actual occurrence of the at least one threat event;
  utilize, upon the detection of the imminent occurrence of the at least one threat event, a risk analysis model to:
    i) analyze threat event related environmental condition sensor data to predict a risk value that the at least one threat event would cause the damage to the at least one building, and
    ii) generate at least one risk mitigation action that at least reduces the damage to the at least one building during the actual occurrence of the at least one threat event;
  cause to transmit, prior to the actual occurrence of the at least one threat event, based on the at least one risk mitigation action, each respective risk mitigation instruction to each respective actuator of the plurality of actuators so as to cause at least one operational state change of each respective safety device of the plurality of safety devices so as to at least reduce the damage to the at least one building from the at least one threat event;
wherein the plurality of safety devices comprises at least one door-related safety device comprising an electric latch and bolt release device configured to release a latch, a bolt, or both in a door before the actual occurrence of the at least one threat event.

9. The system according to claim 1, wherein the at least one risk mitigation action is based in part on at least one of:
(i) a structure type of the at least one building,
(ii) at least one construction material of the at least one building,
(iii) positions of each of the plurality of safety devices within the at least one building,
(iv) properties of a substrate under the at least one building, and
(v) an estimated seismic event magnitude impacting the at least one building.

10. The system according to claim 1, wherein the at least one building is a skyscraper; and wherein the at least one processor is configured to cause to transmit a risk mitigation instruction to an elevator controller that causes an elevator operating in the skyscraper to stop at a nearest floor and to open doors of the elevator before the actual occurrence of the at least one threat event.

11. A method, comprising:
receiving, by at least one processor, in real time, environmental condition sensor data from at least one environmental condition detection sensor for:
  i) measuring environmental data related to at least one environmental condition that may cause a damage to at least one building, and
  ii) generating the environmental condition sensor data based on the environmental data;
detecting, by the at least one processor, from the environmental condition sensor data, in real time, an imminent occurrence of at least one threat event that would cause the damage to the at least one building;
  wherein the at least one threat event is an earthquake, and the at least one environmental condition detection sensor comprising a plurality of seismic detectors having at least one first seismic detector at a first geographic location and at least one second seismic detector at a second geographic location, different from the first geographic location, and
  wherein the detecting the imminent occurrence of the earthquake comprises comparing seismic data received from the at least one first seismic detector to seismic data received from the at least one second seismic detector;
  wherein a detection of the imminent occurrence of the at least one threat event is prior to an actual occurrence of the at least one threat event, and comprises measuring a seismic P-wave in seismic data from at least one seismic detector from the plurality of seismic detectors;
utilizing, by the at least one processor, upon the detection of the imminent occurrence of the at least one threat event, a risk analysis model for:
  i) analyzing threat event related environmental condition sensor data to predict a risk value that the at least one threat event would cause the damage to the at least one building, and
  ii) generating at least one risk mitigation action that at least reduces the damage to the at least one building during the actual occurrence of the at least one threat event;
    wherein a plurality of safety devices comprises at least one door-related safety device; and
causing, by the at least one processor, to transmit, prior to the actual occurrence of the at least one threat event, based on the at least one risk mitigation action, each respective risk mitigation instruction so as to cause at least one operational state change of each respective safety device of the plurality of safety devices so as to at least reduce the damage to the at least one building from the at least one threat event; and verifying, by the at least one processor, the imminent occurrence of the earthquake as reliable by applying a coincidence criterion to the seismic data received from the at least one first seismic detector to the seismic data received from the at least one second seismic detector.

12. The method according to claim 11, wherein the detecting the imminent occurrence of at least one threat event comprises detecting measured values in the environmental condition sensor data that cross predefined threshold values.

13. The method according to claim 11, wherein the at least one processor is a plurality of processors comprising at least one first processor located on a first side of the at least one building and at least one second processor located on a second side of the at least one building.

14. The method according to claim 13, wherein the at least one first processor is configured to communicate with the at least one second processor over an optical fiber deployed from the first side to the second side of the at least one building, and further comprising, verifying, by the at least one first processor, over the optical fiber, the detection of the imminent occurrence with the at least one second processor.

15. A method, comprising:
receiving, by at least one processor, in real time, environmental condition sensor data from at least one environmental condition detection sensor for:
  i) measuring environmental data related to at least one environmental condition that may cause a damage to at least one building, and
  ii) generating the environmental condition sensor data based on the environmental data;
  wherein the at least one environmental condition detection sensor is a plurality of environmental condition detection sensors comprising at least one first environmental condition detection sensor positioned on a first side of the at least one building and at least one second environmental condition detection sensor positioned on a second side of the at least one building;
detecting, by the at least one processor, from the environmental condition sensor data, in real time, an imminent occurrence of at least one threat event that would cause the damage to the at least one building;
  wherein a detection of the imminent occurrence of the at least one threat event is prior to an actual occurrence of the at least one threat event;
utilizing, by the at least one processor, upon the detection of the imminent occurrence of the at least one threat event, a risk analysis model for:
  i) analyzing threat event related environmental condition sensor data to predict a risk value that the at least one threat event would cause the damage to the at least one building, and
  ii) generating at least one risk mitigation action that at least reduces the damage to the at least one building during the actual occurrence of the at least one threat event;
    wherein a plurality of safety devices comprises at least one door-related safety device; and
causing, by the at least one processor, to transmit, prior to the actual occurrence of the at least one threat event, based on the at least one risk mitigation action, each respective risk mitigation instruction so as to cause at least one operational state change of each respective safety device of the plurality of safety devices so as to at least reduce the damage to the at least one building from the at least one threat event; and determining, by the at least one processor, that the detection of the imminent occurrence is unreliable due to a mismatch between the environmental condition sensor data from the at least one first environmental condition detection sensor at the first side and the environmental condition sensor data from the at least one second environmental condition detection sensor at the second side of the at least one building.

16. The method according to claim 11, further comprising, communicating, by the at least one processor, through a cellular modem, a warning to threat management systems located in other buildings within a geographical area around the at least one building before the actual occurrence of the at least one threat event.

17. The method according to claim 11, further comprising, communicating, by the at least one processor, through a cellular modem, a warning before the actual occurrence of the at least one threat event to a national seismic center, a government civil defense unit, a national search and rescue unit, a company control center, or any combination thereof.

18. The method according to claim 11, wherein the at least one risk mitigation action is based in part on at least one of:
  (i) a structure type of the at least one building,
  (ii) at least one construction material of the at least one building,
  (iii) positions of each of the plurality of safety devices within the at least one building,
  (iv) properties of a substrate under the at least one building, and
  (v) an estimated seismic event magnitude impacting the at least one building.

19. An apparatus, comprising:
a housing, comprising:
  a ball bearing;
  a sheath;
  a sleeve comprising a sleeve cavity and a hole for inserting the ball bearing;
  a push rod with a push rod cavity configured to be inserted into the sleeve cavity;
    wherein the push rod comprises a groove;
  a spring configured to be held within the sleeve cavity and the push rod cavity,
    wherein the sleeve and the push rod are configured to be inserted into the sheath;
    wherein the sheath is configured to hold the ball bearing in the groove and the hole when the spring is compressed within the sleeve cavity and the push rod cavity; and
  a solenoid coupled to the sheath that is configured to move the sheath when an electrical signal is applied to the solenoid so as to release the ball bearing in the hole from the groove of the push rod that causes the compressed spring to push out the push rod from the housing so as to push open a door from a doorframe when the door is unaffixed to the doorframe.

20. The apparatus according to claim 19, wherein the housing is mounted on the doorframe, and wherein the push rod pushes on a steel bumper mounted on the door so as to push open the door from the doorframe.

21. The apparatus according to claim 19, further comprising a push lever comprising a first end and a second end;
  wherein the housing is mounted within the door;

wherein the first end of the push lever is coupled to the doorframe through an opening in the door and the second end is coupled to the push rod in the housing within the door; and wherein the first end of the push lever is configured to push open the door from the doorframe through the opening in the door when the push rod is pushed out from the housing.

\* \* \* \* \*